US012579287B2

(12) United States Patent
Panshin

(10) Patent No.: US 12,579,287 B2
(45) Date of Patent: Mar. 17, 2026

(54) CHAINING MESSAGE AUTHENTICATION CODES

(71) Applicant: Hewlett-Packard Development Company, L.P., Spring, TX (US)

(72) Inventor: Stephen D. Panshin, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 19/122,410

(22) PCT Filed: Jul. 31, 2023

(86) PCT No.: PCT/US2023/029152
§ 371 (c)(1),
(2) Date: Apr. 18, 2025

(87) PCT Pub. No.: WO2025/029251
PCT Pub. Date: Feb. 6, 2025

(65) Prior Publication Data
US 2026/0010645 A1 Jan. 8, 2026

(51) Int. Cl.
*G06F 21/60* (2013.01)
*G06F 21/70* (2013.01)
(Continued)

(52) U.S. Cl.
CPC ............ *G06F 21/608* (2013.01); *G06F 21/70* (2013.01); *H04L 9/0618* (2013.01); *H04L 9/3242* (2013.01)

(58) Field of Classification Search
None
See application file for complete search history.

(56) References Cited

U.S. PATENT DOCUMENTS

| | | | |
|---|---|---|---|
| 9,619,663 B2 | 4/2017 | Refstrup | |
| 10,560,269 B2 * | 2/2020 | Johnson | ................ H04L 9/3239 |

(Continued)

FOREIGN PATENT DOCUMENTS

EP 3477400 A1 5/2019

OTHER PUBLICATIONS

Dworkin, Morris, "Recommendation for Block Cipher Modes of Operation: Galois/Counter Mode (GCM) and GMAC", NIST Special Publication 800-38D, Nov. 2007, 39 pages.

(Continued)

*Primary Examiner* — Khang Do
(74) *Attorney, Agent, or Firm* — Foley & Lardner LLP

(57) ABSTRACT

Disclosed herein are systems and methods for authenticated-encryption and authenticated-decryption operations for conducting authenticated-encryption communications between a host device and a peripheral device. A sending device performs authenticated-encryption operations that apply a symmetric encryption algorithm on plaintext to encrypt the data and generate an authentication tag or message authentication code ("MAC"). The sending device sends the ciphertext and a shared subset of the tag to the receiving device, and stores a non-shared subset of the tag in cache. The receiving device performs authenticated-decryption operations that verify the tag and decrypt the ciphertext to recover the data by applying the effective inverse of the symmetric encryption algorithm (or decryption algorithm) and using the known parameters.

20 Claims, 6 Drawing Sheets

(51) Int. Cl.
    *H04L 9/06*     (2006.01)
    *H04L 9/32*     (2006.01)

(56)            References Cited

U.S. PATENT DOCUMENTS

| | | | | |
|---|---|---|---|---|
| 12,050,703 | B1 * | 7/2024 | Peeters | G06F 21/44 |
| 12,513,000 | B2 * | 12/2025 | Hung | H04L 9/3242 |
| 2012/0076293 | A1 * | 3/2012 | Smith | H04L 9/0656 |
| | | | | 380/28 |
| 2013/0321853 | A1 * | 12/2013 | Lee | H04N 1/4433 |
| | | | | 358/1.14 |
| 2017/0032135 | A1 * | 2/2017 | Refstrup | G06F 21/608 |
| 2018/0032718 | A1 * | 2/2018 | Soto | G06F 21/606 |
| 2018/0294968 | A1 | 10/2018 | Johnson et al. | |
| 2019/0356468 | A1 | 11/2019 | Zeh et al. | |
| 2020/0171836 | A1 * | 6/2020 | Gardner | B41J 2/17546 |
| 2021/0326296 | A1 * | 10/2021 | Panshin | B41J 2/17553 |
| 2022/0171545 | A1 * | 6/2022 | Chritz | G06F 3/0655 |
| 2022/0321328 | A1 * | 10/2022 | Tsarfati | H04L 9/0822 |
| 2024/0152655 | A1 * | 5/2024 | Hamburg | G06F 21/602 |
| 2025/0024265 | A1 * | 1/2025 | Peeters | H04W 12/50 |
| 2025/0286726 | A1 * | 9/2025 | Luo | H04L 9/0637 |
| 2025/0286871 | A1 * | 9/2025 | Kida | G06F 13/28 |
| 2025/0365130 | A1 * | 11/2025 | Mukai | H04L 9/0618 |

OTHER PUBLICATIONS

Jeyaprakash et al., "Secured Smart Card Using Palm Vein Biometric On-Card-Process", 2008 International Conference on Convergence and Hybrid Information Technology, Aug. 2008, pp. 548-551.

* cited by examiner

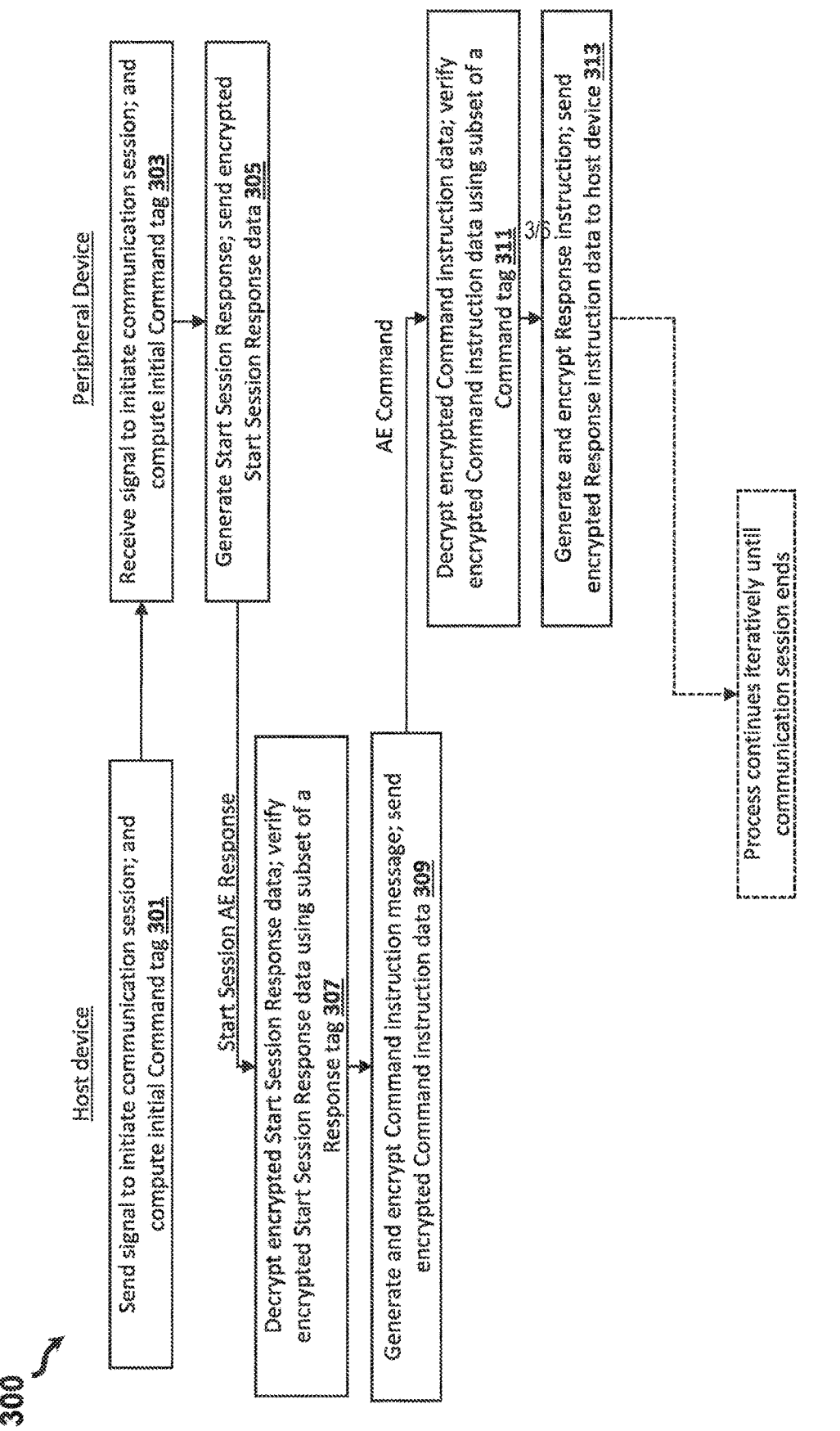

300

Host device

Send signal to initiate communication session; and compute initial Command tag 301

Decrypt encrypted Start Session Response data; verify encrypted Start Session Response data using subset of a Response tag 307

Generate and encrypt Command instruction message; send encrypted Command instruction data 309

Peripheral Device

Receive signal to initiate communication session; and compute initial Command tag 303

Generate Start Session Response; send encrypted Start Session Response data 305

Decrypt encrypted Command instruction data; verify encrypted Command instruction data using subset of a Command tag 311

Generate and encrypt Response instruction; send encrypted Response instruction data to host device 313

Start Session AE Response

AE Command

3/6

Process continues iteratively until communication session ends

*FIG. 3*

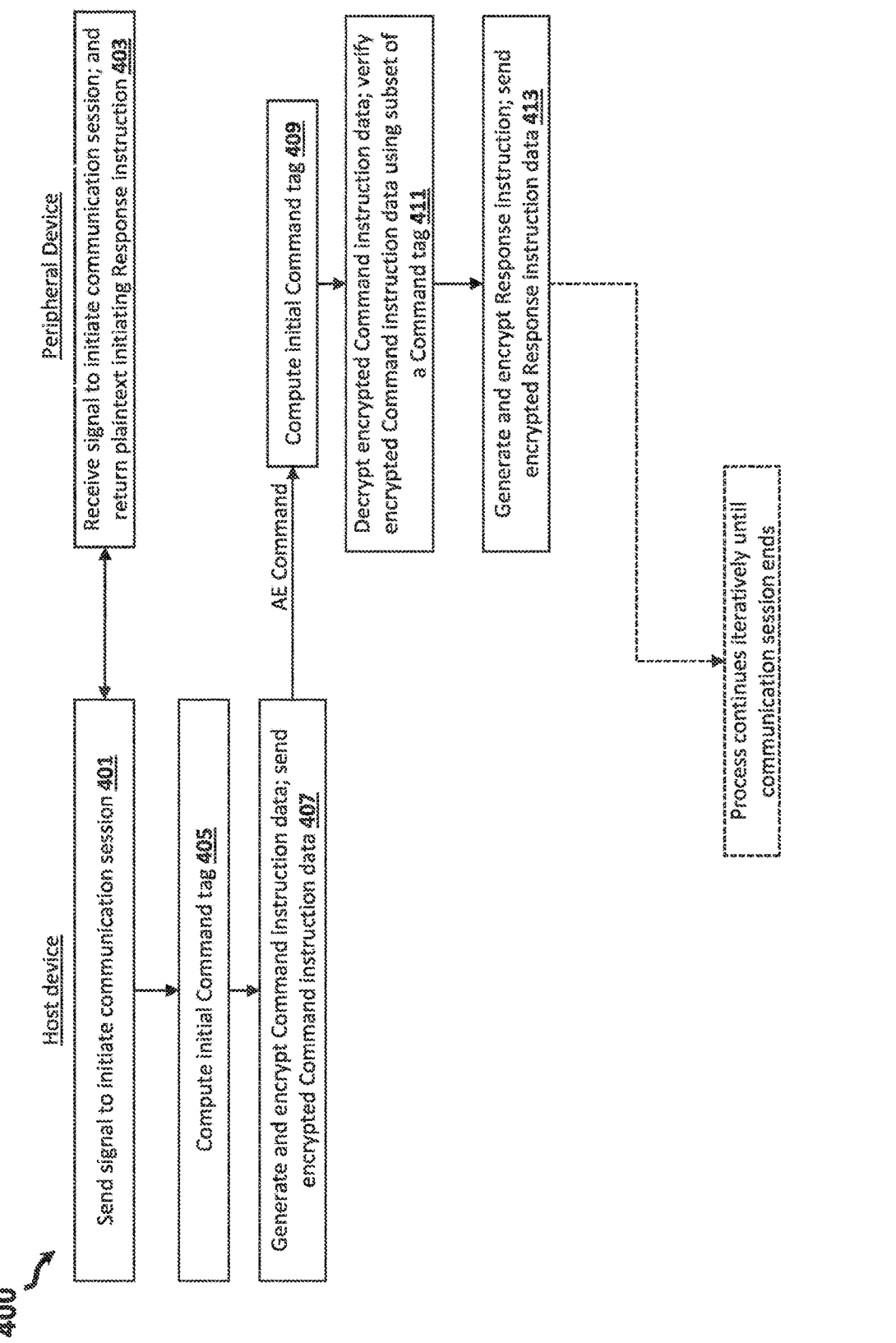

Host device

Send signal to initiate communication session 401

Compute initial Command tag 405

Generate and encrypt Command instruction data; send encrypted Command instruction data 407

Peripheral Device

Receive signal to initiate communication session; and return plaintext initiating Response instruction 403

AE Command → Compute initial Command tag 409

Decrypt encrypted Command instruction data; verify encrypted Command instruction data using subset of a Command tag 411

Generate and encrypt Response instruction; send encrypted Response instruction data 413

Process continues iteratively until communication session ends

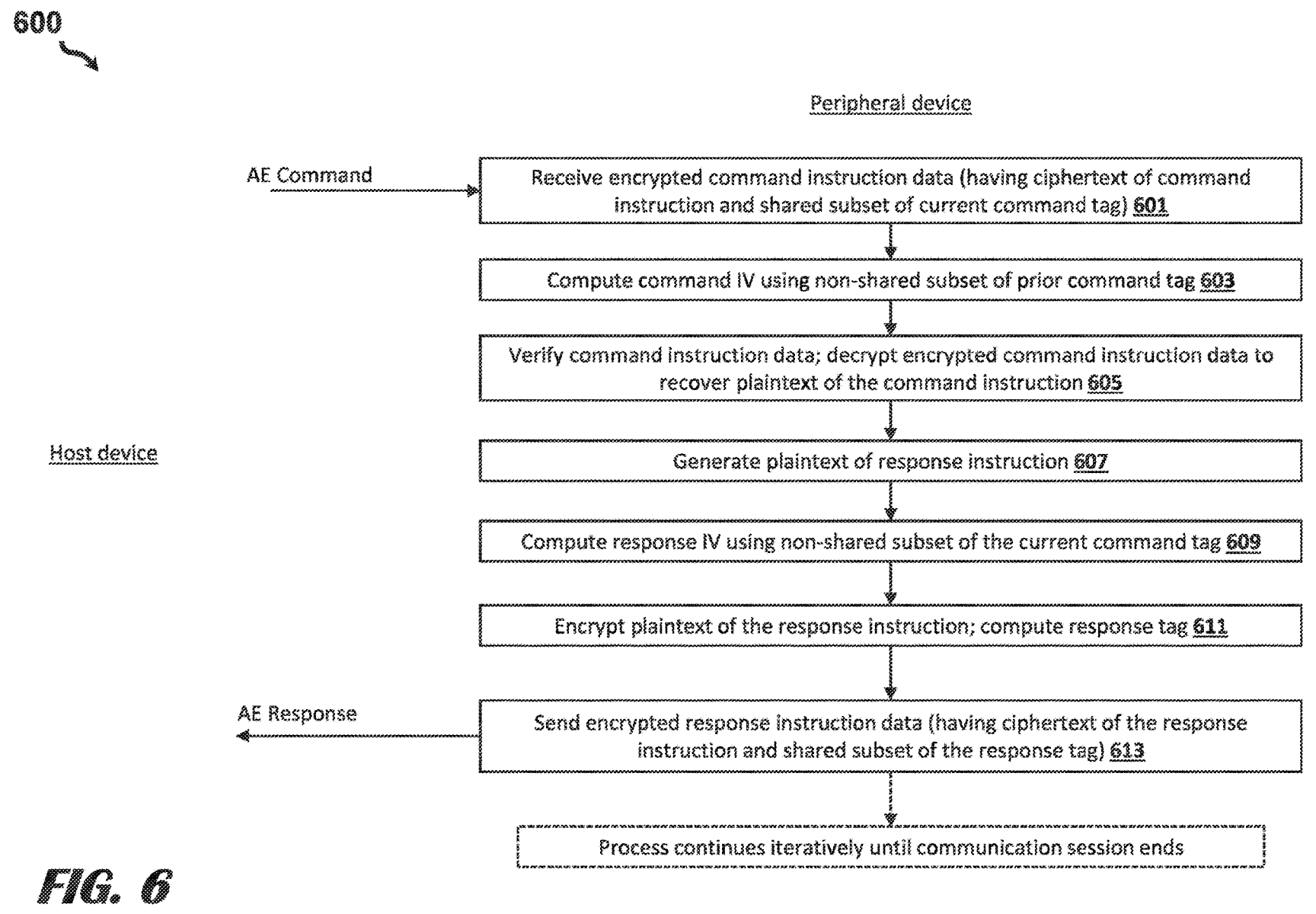

Peripheral device

Receive encrypted command instruction data (having ciphertext of command instruction and shared subset of current command tag) 601

AE Command

Compute command IV using non-shared subset of prior command tag 603

Verify command instruction data; decrypt encrypted command instruction data to recover plaintext of the command instruction 605

Host device

Generate plaintext of response instruction 607

Compute response IV using non-shared subset of the current command tag 609

Encrypt plaintext of the response instruction; compute response tag 611

Send encrypted response instruction data (having ciphertext of the response instruction and shared subset of the response tag) 613

AE Response

Process continues iteratively until communication session ends

FIG. 6

CHAINING MESSAGE AUTHENTICATION CODES

CROSS-REFERENCE TO RELATED APPLICATIONS

This application is a U.S. National Stage Entry under 35 U.S.C. § 371 of International Application No.: PCT/US2023/029152 filed Jul. 31, 2023, which is incorporated herein by reference in its entirety.

BACKGROUND

When connecting or communicating between peripheral devices and host devices via a communication bus, the peripheral device and the host device typically perform various handshake protocols or operations. As an example, two-dimensional (2D) and three-dimensional (3D) printing systems include a number of replaceable print apparatus components (sometimes referred to as "consumables"), such as inkjet printhead assemblies, and print material containers (e.g. inkjet cartridges, toner cartridges, ink supplies, build material supplies, etc.), where the printer is a host device and the replaceable print apparatus is a peripheral. In this example, the components of the replaceable print apparatus include logic circuitry to communicate with logic circuitry of the print apparatus. Information communicated by the consumable components, for example, may include an identity (such as a serial number and/or brand, for example), identifying characteristics (such as a color, color mapping, and a color map reconstruction, for example), and operating information (such as a print material level and an operating pressure).

In many cases, the host device and peripheral device communicate such information for authentication or verification operations performed by the devices during preamble handshake operations or during ongoing inter-device communications. For instance, the host device may execute verification functions that verify whether the peripheral device is compatible, permitted, or otherwise expected to function with the host device. These verification functions may include, for example, applying encryption algorithms and encryption keys on the information or inputs generated by or exchanged between the devices. Typically, one or more devices must successfully perform the authentication or verification operations to begin or continue interoperability between the host device and the peripheral device.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

FIG. 3 shows operations of a method for authenticated-encryption communication between a host device and peripheral device via a data communications bus, according to an embodiment.

FIG. 4 shows operations of a method for authenticated-encryption communication between a host device and peripheral device via a data communications bus, according to an embodiment.

FIG. 6 shows operations of a method for a peripheral device to verify or authenticate a host device during a communication session established over a communication bus, according to an embodiment.

DETAILED DESCRIPTION

Figure 1:
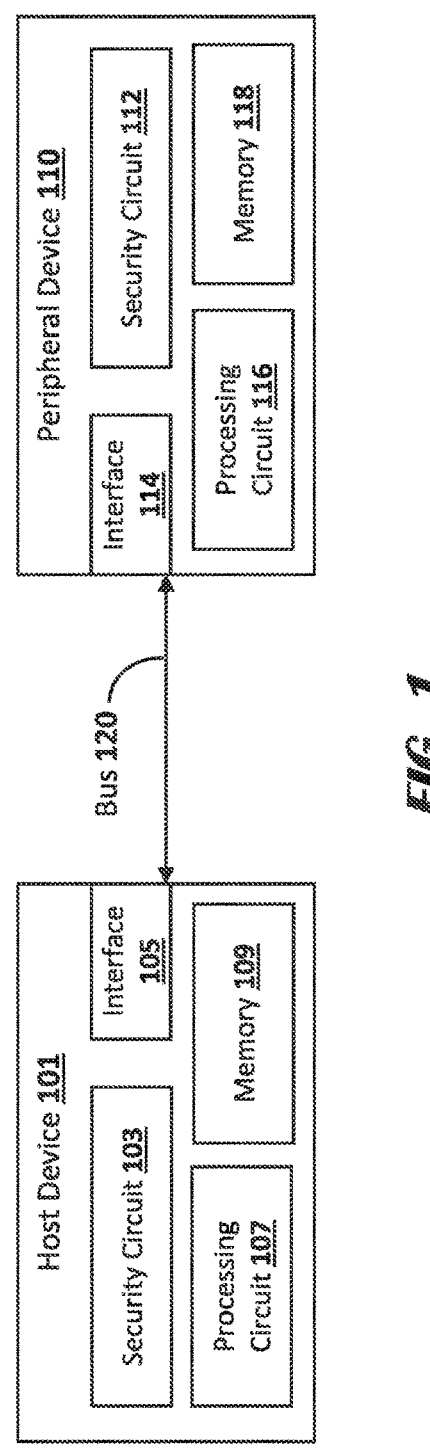
FIG. 1 shows components of an example system including a host device coupled to a peripheral device, according to an example embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Peripheral devices include consumable devices or external (e.g., plug-and-play) devices that couple to a host device and perform certain functions according to command instructions from the host device. Non-limiting examples of peripheral devices include replaceable printer devices containing consumable resources (e.g., ink, toner, printheads), other high-precision fluid dispensing/propelling/sensing devices including labs-on-chips, and external I/O devices (e.g., mouse, monitor, keyboard, external hard disk). These peripheral devices couple to and communicate a sequence of commands and responses with a host device, such as a printer or personal computer.

The host device (e.g., printer) and peripheral device (e.g., replaceable printer component) should conduct encrypted communication and validate, authenticate, or otherwise verify each other. It is advantageous for peripherals to be able to support authenticated and encrypted communications with the host device, where the peripheral provides verifiable authenticating proof that the peripheral is authentic, where the devices communicate encrypted data in secrecy. Moreover, it also desirable for encryption and validation processes to provide cryptographic efficiency, communication efficiency, and assurances as to the integrity in the command-response communication sequence between the devices.

In a common example, to ensure the quality and compatibility of a replaceable print device (e.g., a print cartridge), and thereby ensure proper operation of the print system, a print apparatus may perform validation processes to verify that a replaceable print device originates from an authorized source. For example, a print apparatus command (a "read" request) may request identification and/or authentication information to validate the replaceable print device, which may result in the replaceable print device loading such information into a memory buffer, and subsequently serially transmitting such information via the data bus. In some cases, to perform such validation, communications between the print apparatus and the replaceable print device may be cryptographically authenticated.

Prior approaches to authenticated and encrypted communications between peripheral and host devices may suffer from one or more problems. Prior solutions employed authentication and encryption inconsistently, varying the deployment or implementation amongst communication channels, or amongst commands and responses. For instance, sometimes providing authentication only on a particular channel, or sometimes providing authentication plus partial (rather than full) encryption on responses from the peripheral to the host device. In some prior solutions, the devices may use different cryptographic schemes primitives to implement authentication (e.g., AES-CMAC) versus encryption (e.g., AES-CBC). Some prior approaches used different encryption keys to implement cryptographic authentication and encryption algorithms. Another problem is that some companies required the devices to apply proprietary cryptographic schemes when implementing authenticated-encryption communications.

A possible solution would configure the host device and peripheral device to apply a standardized encryption function known as Advanced Encryption Standard (AES), according to a standardized implementation known as Galois-Counter Mode (GCM). The standardized AES-GCM scheme or primitive is described in NIST SP800-38D, "Recommendation for Block Cipher Modes of Operation: Galois/Counter Mode (GCM) and GMAC." The AES-GCM standard should provide for authenticated-encryption communications, offering secrecy, authentication, and integrity.

A problem, however, is that the AES-GCM standard requires the devices to compute unique initialization vectors (IVs) for each instance that the encryption function is invoked by one of the devices. Ideally, the devices need not send the IV along with the command data or response data. Moreover, the processes for authenticated-encryption communication should remain resistant against side-channel attacks. What is needed is a means for implementing an authenticated-encryption communication that optimally fulfills the requirements of IV-uniqueness in the AES-GCM standard, without sending the IVs between the devices and without exposing the devices to side-channel attacks.

Embodiments described herein address this requirement for IV-uniqueness without the shortcomings in implementing the AES-GCM standard. The devices compute the IV by concatenating or algorithmically combining a pre-configured diversification constant value and deterministic values. The AES-GCM standard calls for two frameworks for generating the IV: constructing the IV by relying on deterministic elements to achieve uniqueness, and relying on a sufficiently long output string from a secure random-bit generator. By incorporating the combination of the diversification constants, deterministic values (e.g., counter, timer, clock), and dynamic shared secret values (e.g., non-shared subsets of authentication tags), the embodiments satisfy the requirements of the deterministic construction framework for generating the unique IVs. Moreover, by incorporating the non-shared subset of a prior authentication tag into the IV, the embodiments herein increase the resistance to side-channel analysis. Furthermore, despite the secrecy of the values used to construct the IV, the host device and peripheral device each stores or could compute certain values for constructing the IV. In this way, the devices need not transmit (and expose) the complete IV in the command or response data.

Embodiments described herein include a host device and peripheral device that perform features and functions of authenticated-encryption and authenticated-decryption operations. The authenticated-encryption operations described herein generally provide for an improved approach to authenticated-encryption standards (e.g., AES-GCM). The embodiments of the authenticated-encryption operations include, at least in part, an authenticated-encryption operation and an authenticated-decryption operation. These operations may be logically represented as:

$$\text{Authenticated-encryption: } (C, \text{tag}) = ALGO\,[SK](IV, P);$$

$$\text{Authenticated-decryption 2: } P = ALGO^{-1}[SK](IV, C, \text{tag});$$

$$\text{Authenticated-decryption 2: } (P, LSB(\text{tag})) =$$

$$ALGO^{-1}[SK](IV, C, MSB(\text{tag}))$$

Where:
ALGO=application of the symmetric encryption algorithm, as applied for authenticated-encryption processes;
$ALGO^{-1}$=application of the effective inverse of the symmetric encryption algorithm (or symmetric decryption algorithm), as applied for authenticated-decryption processes;
IV=initialization vector (e.g., 12 bytes);
P=plaintext of instruction (e.g., arbitrary length; empty/null);
C=ciphertext of instruction (e.g., arbitrary length equal to P);
tag=authentication tag (e.g., 16 bytes), which may be a command tag or response tag;
MSB(tag)=shared subset of the most significant bytes or bits (MSBs) of the authentication tag (e.g., 8 MSBs of tag)
LSB(tag)=non-shared subset of the least significant bytes or bits (LSBs) of the authentication tag (e.g., 8 LSBs of tag); and
SK=symmetric session key applied to the parameters (e.g., 16 bytes).

As an example, the authenticated-encryption function executes the encryption algorithm, which applies the session key on an IV and plaintext of an instruction (e.g., command instruction or response instruction). The encryption algorithm computes the ciphertext of the instruction and an authentication tag (e.g., command tag or response tag). A sending device may partition the bytes of the authentication tag into two subsets: a shared subset and a non-shared subset. Another potential logical representation of calculating an authentication tag includes: (C, MSB(tag)‖LSB (tag))= ALGO [SK](IV, P), where the symmetric encryption algorithm (ALGO) computes the ciphertext (C) and the authentication tag (tag) comprising the shared subset (MSB (tag)) and the non-shared subset (LSB(tag)).

In some cases, the sending device stores the non-shared subset into a cache memory for use in a later iteration. In some cases, the sending device treats the non-shared subset as a discard subset that is not saved or otherwise used for later operations. The sending device may transmit a package of encrypted instruction data (e.g., encrypted command data or encrypted response data) to a receiving device, where the encrypted instruction data comprises the ciphertext of the instruction and the shared subset of the authentication tag.

As another example, the authenticated-decryption function executes the effective inverse of the symmetric encryption algorithm, which applies a session key on encrypted instruction data and one or more parameters. In this example, a receiving device may apply the encryption algorithm on an IV, ciphertext of an instruction, and a shared subset of an authentication tag. The symmetric encryption algorithm computes the plaintext of the instruction and a non-shared subset of an authentication tag.

Additional details about the features and functions of the authenticated-encryption and authenticated-decryption operations are described further below. The symmetric encryption implements the same symmetric key for encryption and decryption functions, though the encryption algorithm employed at encryption versus decryption may vary. As used herein, the decryption functions may be described in terms of an effective inverse of the symmetric encryption algorithm, a symmetric encryption algorithm, or a decryption algorithm.

The features and functions of the embodiments described herein may provide various advantages over prior approaches, and may provide any number of additional or alternative benefits, as well. For instance, embodiments implement an approach to authenticated-encryption communications that cryptographically link successive iterations of command tags in sequential order. As an example, for a given iteration of a communication session, the authentication tag of a command depends upon the authentication tag computed for a previous command. For later iterations of the communication session, the authentication tag of a later command depends upon the authenticated tags computed across each successive prior command. This chaining approach provides additional protection against attacks that attempt to modify the command sequence. Another effect of certain embodiments of peripheral devices of this disclosure is that these can be authenticated by, (novel) host devices configured to authenticate according to certain aspects of this disclosure.

Some embodiments may implement an adaptation of the AES-GCM industry standard cryptographic algorithm. This limits the need for, or exposure of, proprietary cryptographic algorithms. Proprietary encryption algorithms are typically targets of interest to competitors, pirates, or malicious attackers who want to make a compatible peripheral device in order to make a competing peripheral or host device, skirt payment requirements, or create spoofed or fraudulent devices. In addition, implementing proprietary cryptographic algorithms in software and hardware components (e.g., security circuitry) of peripheral or host devices is generally more complicated and expensive. Using AES-GCM provides the strength of proprietary encryption, while also easing implementation, broadening interoperability, reducing development costs, and suggesting a less-enticing target for bad actors, among other benefits.

Embodiments described herein may perform authenticated-encryption according to an "encrypt-then-MAC" approach, where the plaintext of an instruction is encrypted and then the authentication tag is generated. The authentication tag may be validated without decrypting the ciphertext of the instruction. Certain prior cryptographic approaches (e.g., AES-CCM) follow a "MAC-then-encrypt" approach, where the MAC is generated before encrypting the plaintext instruction, and both the MAC and the plaintext instruction are encrypted together. To validate a sending device using the MAC, a receiving device must decrypt the joint ciphertext of the MAC and instruction. This prior approach may lead to more exposure of session keys and attacks on the AES encryption implementation.

Embodiments described herein may use the same authenticated encryption scheme across multiple channels of the bus (e.g., Pairing, Nominal, and Admin). This includes sharing the same symmetric cryptographic primitives and the same command-response protocol. This improved approach simplifies the specification, reduces the development effort, and yields a smaller code size.

Embodiments may implement a single key or algorithm for authenticated-encryption communication. This symmetric encryption approach is generally more efficient than using separate keys and algorithms, as in some prior approaches.

To address the IV requirements of certain encryption standards, embodiments implement an IV construction operation that need not rely on a communication partner device to send the IV in the command-response sequence. This is generally more efficient and satisfies the requirements of the standard. Moreover, the IV construction algorithm incorporates deterministic values (e.g., counters) and dynamic shared secret values (e.g., non-shared subsets of authentication tags) in a manner that is beneficially more secure than prior approaches that use deterministic values. When using deterministic values to construct the IVs, the devices need not transmit deterministic values and IVs, but this could render the devices potentially more susceptible to side-channel analysis. The devices need only send the IVs if incorporating deterministic values. Embodiments described herein deterministic values (e.g., counters) and dynamic shared secret values (e.g., non-shared subsets of authentication tags) when constructing the IVs in manner that may beneficially complicate side-channel analysis exploits by bad actors.

FIG. 1 shows components of an example system 100 including a host device 101 coupled to a peripheral device 110, according to an example embodiment. The host device 101 includes a host bus interface 105 for communicating or exchanging message data with the peripheral device 110 over a bus 120. Likewise the peripheral device 110 includes a peripheral interface 114 for communicating message data with the host device 101 over the bus 120.

The host device 101 may be any electronic device having a security circuit 103 and processing circuit 107 and capable of performing the various processes and tasks described herein. Non-limiting examples of the host device 101 include a computing device (e.g., desktop computer, laptop, server, tablet, smart phone), printer apparatus, and multi-device peripheral dock, among others.

The peripheral device 110 may include any consumable or electronic device having a peripheral security circuit 112 (sometimes referred to as a peripheral authenticating circuit) and processing circuit 116 and capable of performing the various processes and tasks described herein. Non-limiting examples of the peripheral device 110 include consumable print cartridges and computer-connected I/O devices (e.g., mouses, keyboards, monitors, printer apparatuses), among other potential types of peripheral devices 110.

The bus 120 includes hardware components forming a communications link for carrying signals and digital information, such as message data, between the host device 101 and the peripheral device 110. The bus 120 includes, for example, an electrical, optical, infrared, or other suitable signal information transfer media between the host device 101 and the peripheral device 110, according to corresponding data communications protocols. As an example, in some embodiments, communication between the host device 101 and peripheral device 110 may be accomplished via the bus 120 according to serial data bus protocols, such as Serial Peripheral Interface (SPI) protocol or Inter-Integrated Circuit (I2C) protocol. Further non-limiting examples of the hardware and protocols for the bus 120 may include Peripheral Component Interconnect (PCI), PCI express (PCIe), Infiniband, USB, and Firewire, among others.

Turning now to the host device 101, the host device 101 comprises one or more host bus interfaces 105 for communicating via corresponding data busses 120. The host bus interface 105 is a component of, or coupled to, the logic circuitry components of the host processing circuit 107 or the host security circuit 103. The host bus interface 105 includes various logic circuitry for performing processes allowing the host device 101 to communicate signals or digital information with the peripheral device 110 via the bus 120. In operation, the components of the host device 101 implement the host bus interface 105 to encode or decode the data received or transmitted via the bus 120. For instance, in some cases, the host processing circuit 107 or the host security circuit 103 of the host device 101 is configured to encode the command message data for transmission via the host bus interface 105 to the peripheral device 110 according to the particular communication protocol or standard of the bus 120. In some embodiments, for example, the host bus interface 105 includes an I2C interface where the bus 120 includes an I2C-capable communications bus.

The host processing circuit 107 performs the various operations or functions intended for the host device 101. As an example, the host device 101 is a personal computer and the processing circuit 107 includes the CPU of the personal computer. As another example, the host device 101 is a printing apparatus and the processing circuit 107 is a controller device that receives printing instructions and controls operations of a print cartridge to apply ink or toner according to the printing command instructions. The host processing circuit 107 includes any processor, controller (or microcontroller), or logic device (or combination of logic devices) capable of performing the various processes described herein. The host processing circuit 107 may be situated on a dedicated printed circuit board (PCB) or integrated circuit (IC). Additionally or alternatively, components of the host processing circuit 107 may be situated on a PCB or IC with the components of the host security circuit 103 or host memory 109. Non-limiting examples of components of the host processing circuit 107 include central processing units (CPU), graphics processing units (GPU), application-specific integrated circuits (ASICs), field-programmable gate arrays (FPGAs), electronic logic gates, and registers, among other potential logic or storage components.

In operation, the host processing circuit 107 may generate, send, receive, and process various types of instructions for a command-response communications sequence with the peripheral device 110. The host processing circuit 107 may generate various command instructions for execution by the peripheral device 110. The command instructions may include operational instructions related to the functions of the peripheral device 110 (e.g., read/write data, execute print job that applies ink or toner to print medium). The command instructions may include communications, overhead, or signaling instructions related to the inter-device communications administration, such as a command signal for initiating or beginning a communication session.

The host security circuit 103 performs the various operations described herein for authenticated-encryption communications with the peripheral device 110, allowing the host security circuit 103 to authenticate or validate the peripheral device 110 as compatible or permissible and communicate securely over the bus 120. In some cases, the host security circuit 103 may generate command instructions for the peripheral device 110, such as the command signal for initiating or beginning a communication session.

The security circuit 103 includes any processor, controller (or microcontroller), or logic device (or combination of logic devices) capable of performing the various processes described herein. The security circuit 103 may be situated on a dedicated printed circuit board (PCB) or integrated circuit (IC). Additionally or alternatively, components of the security circuit 103 may be situated on a PCB or IC with the components of the host processing circuit 107 or host memory 109. Non-limiting examples of components of the security circuit 103 include central processing units (CPU), graphics processing units (GPU), application-specific integrated circuits (ASICs), field-programmable gate arrays (FPGAs), electronic logic gates, and registers, among other potential logic or storage components.

The host memory 109 may include any machine-readable digital storage or non-transitory electronic signal storage. The memory 109 is situated on or coupled to the PCB having the host processing circuit 107 or security circuit 103. The memory 109 may store the various types of information received or generated by the host processing circuit 107 or security circuit 103. Non-limiting examples of the host memory 109 includes registers, latches, gates, memory (e.g., RAM), and similar forms of storage media capable of storing data generated by the host security circuit 103 or host processing circuit 107, or received from the peripheral device 110.

In some cases, the host memory 109 may function as a cache memory for the host security circuit 103 to store into the host memory 109 and reference various types of data for the authenticated-encryption operations, such as storing a non-shared subset of an authentication tag (oftentimes referred to as a message authentication code (MAC) in the art) computed by the host security circuit 103, or initialization vectors computed for the symmetric encryption functions, among other types of information. In some embodiments, the host memory 109 may store any number of shared, symmetric, session keys used by the host security circuit 103 during authenticated-encrypted communications with the peripheral device 110. In some implementations, the session keys are pre-stored or loaded into the host memory 109. Additionally or alternatively, in some implementations, the host security circuit 103 (or other device) cryptographically computes or provisions the session keys for storage into the host memory 109 and the peripheral memory 118 based upon a master or parent encryption key. For instance, the host security circuit 103 may derive the session key from the master key, which may include using pre-configured parameters or parameters received from the peripheral device 110 in a response instruction for establishing communication session. In this way, the host security circuit 103 and peripheral security circuit 112 are configured to obtain one or more session keys to apply to the data of the communication exchanges between the host device 101 and peripheral device 110.

Turning now to the peripheral device 110, the peripheral device 110 comprises one or more peripheral interface 114 for communicating via corresponding busses 120. The peripheral interface 114 is a component of, or coupled to, the logic circuitry components of the peripheral processing circuit 116 or the peripheral security circuit 112. The peripheral interface 114 includes various logic circuitry for performing processes allowing the peripheral device 110 to communicate signals or digital information with the host device 101 via the bus 120. In operation, the components of the peripheral device 110 implement the peripheral interface 114 to encode or decode the message data received or transmitted via the bus 120. For instance, in some cases, the peripheral security circuit 112 or the peripheral processing circuit 116 of the peripheral device 110 is configured to encode the response message data for transmission via the peripheral interface 114 to the host device 101 according to the particular communication protocol or standard of the bus 120. In some embodiments, for example, the peripheral interface 114 includes an I2C interface where the bus 120 includes an I2C-capable communications bus.

The peripheral security circuit 112 performs the various operations described herein for encrypted communications with the host device 101 and for verifying the host device 101 as compatible or permissible. The peripheral security circuit 112 includes any processor, controller (or microcontroller), or logic device (or combination of logic devices) capable of performing the various processes described herein. The peripheral security circuit 112 may be situated on a dedicated printed circuit board (PCB) or integrated circuit (IC). Additionally or alternatively, components of the peripheral security circuit 112 may be situated on a PCB or IC with the components of the peripheral processing circuit 116 or peripheral memory 118. Non-limiting examples of components of the peripheral security circuit 112 include central processing units (CPU), graphics processing units (GPU), application-specific integrated circuits (ASICs), field-programmable gate arrays (FPGAs), electronic logic gates, and registers, among other potential logic or storage components.

The peripheral processing circuit 116 performs the various operations or functions intended for the peripheral device 110. As an example, the peripheral device 110 is a I/O device (e.g., mouse, camera) coupled to a personal computer as the host device 101, where the peripheral processing circuit 116 includes the controller or logic circuit for capturing and translating optical signals to electrical signals for the personal computer. As another example, the host device 101 is a printing apparatus and the peripheral device 110 is a print cartridge having logic circuitry of the peripheral processing circuit 116 that receives printing instructions from host device 101 and controls operations of the print cartridge to apply ink or toner. The peripheral processing circuit 116 includes any processor, controller (or microcontroller), or logic device (or combination of logic devices) capable of performing the various processes described herein. The peripheral processing circuit 116 may be situated on a dedicated printed circuit board (PCB) or integrated circuit (IC). Additionally or alternatively, components of the peripheral processing circuit 116 may be situated on a PCB or IC with the components of the peripheral security circuit 112 or peripheral memory 118. Non-limiting examples of components of the peripheral processing circuit 116 include central processing units (CPU), graphics processing units (GPU), application-specific integrated circuits (ASICs), field-programmable gate arrays (FPGAs), electronic logic gates, and registers, among other potential logic or storage components.

The peripheral memory 118 may include any machine-readable digital storage or non-transitory electronic signal storage. The peripheral memory 118 is situated on, or coupled to, the PCB having the peripheral security circuit 112 or peripheral processing circuit 116. The peripheral memory 118 may store the various types of information received or generated by the peripheral security circuit 112 or peripheral processing circuit 116. Non-limiting examples of the peripheral memory 118 includes registers, latches, gates, memory (e.g., RAM), and similar forms of storage media capable of storing data generated by the peripheral security circuit 112 or peripheral processing circuit 116, or received from the host device 101.

In some cases, the peripheral memory 118 may function as a cache memory for the peripheral security circuit 112 to store into the peripheral memory 118 and reference various types of data for the encryption operations or other verification processes, such as a shared subset of an authentication tag received from the host device 101, a non-shared subset of an authentication tag computed by the peripheral device 110, or initialization vectors computed for the encryption function, among other types of information. In some embodiments, the peripheral memory 118 of the peripheral device 110 is configured to store any number of shared, symmetric, session keys for authenticated-encryption communications. In some implementations, the session keys are pre-stored or loaded into the peripheral memory 118.

With respect to conducting authenticated-encryption communications, the host security circuit 103 (of the host device 101) and the peripheral security circuit 112 (of the peripheral device 110) may perform the various features and functions described herein. The authenticated-encryption operations may include, for example, executing the functions of the symmetric encryption algorithm applied to the parameter inputs; handling the session keys used for applying the encryption keys; computing the IVs; computing the authentication tags; and verifying the authentication tags.

To initiate a new authenticated-encryption communication session with the peripheral device 110, the host device 101 may transmit an initializing command signal to the peripheral device 110. The initializing command signal includes an instruction indicating to the peripheral security circuit 112 or peripheral processing circuit 116 that the host security circuit 103 or host processing circuit 107 intends to initiate the new communication session. The peripheral device 110 may generate an initial response instruction acknowledging the peripheral device 110 is prepared for the communication session.

In some embodiments, the bus 120 may comprise several logical channels for communicating certain types of data. For instance, the bus 120 may include an admin channel, pairing channel, nominal channel, or other types of channels. In some embodiments, the host device 101 and the peripheral device 110 may perform the authenticated-encryption communication through the admin channel. In some embodiments, the host device 101 and the peripheral device 110 may use various channels for successive iterations of the authenticated-encryption communications. As an example, the host device 101 and peripheral device 110 may exchange the initializing command and the initializing response via the admin channel of the bus 120, and then exchange command instructions and response instructions via another channel (e.g., nominal channel, pairing channel) of the bus 120. In some embodiments, "initializing" commands are channel-specific, with respect to the channel of the bus 120. For example, if the host device 101 and the peripheral device 110 start an Admin session (i.e., by the host device 101 issuing a START SESSION ADMIN command via the Admin channel), then the peripheral device 110 and host device 101 may then exchange the authenticated-encryption communication commands and responses in via the Admin channel.

The host security circuit 103 may perform verification processes that verify the peripheral device 110 is compatible or otherwise legitimate. The verification processes include computing authentication tags in accordance with an encryption algorithm executed by the host security circuit 103. To verify the peripheral device 110, the host security circuit 103 computes the full authentication tag, and compares a shared portion of the authentication tag data received from the peripheral device 110 (sometimes referred to as a "shared portion" or "shared subset") against a the corresponding shared portion of the full authentication tag computed by the host security circuit 103. In this example, the host memory 109 may function as a cache memory for the host security circuit 103 to store into the host memory 109 and reference various types of data for the encryption processes, such as a shared portion of an authentication tag received from the peripheral device 110, an non-shared portion of the authentication tag computed by the host device 101, or initialization vectors for the encryption functions, among other types of information.

In some implementations, the host memory 109 stores one or more encryption keys applied by the host security circuit 103 for communication sessions (or "session keys"). In some embodiments, the components of the system 100—including the host security circuit 103 and a peripheral security circuit 112 of the peripheral device 110—implement a symmetric encryption algorithm using shared, symmetric encryption keys. In such embodiments, the session keys include such symmetric encryption keys. The host memory 109 and a peripheral memory 118 of the peripheral device 110 are configured to store any number of shared, symmetric, session keys. In some implementations, the session keys are pre-stored or loaded into the host memory 109 or the peripheral memory 118.

Figure 2:
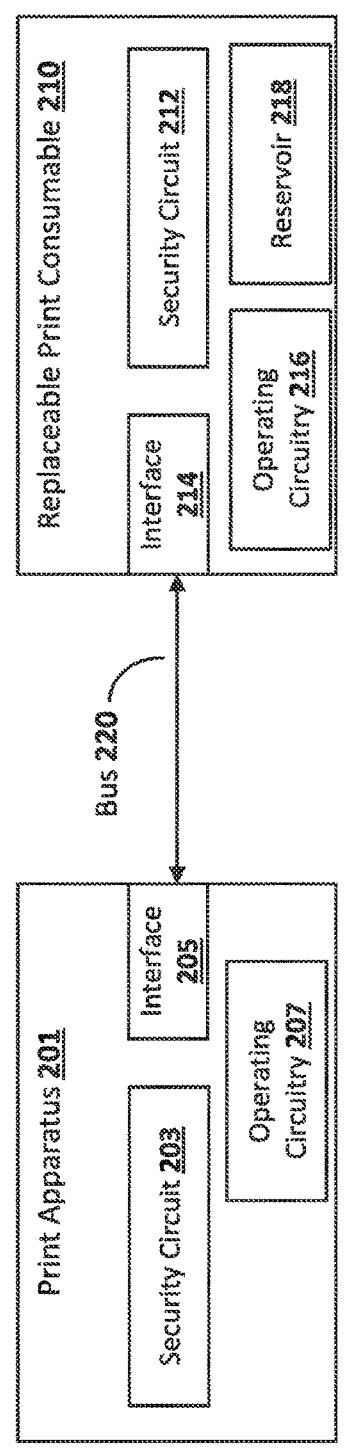
FIG. 2 shows components of an example system including a printer device coupled to a replaceable device, according to an example embodiment.

FIG. 2 shows components of an example system 200 including a printer device 201 coupled to a replaceable device 210 (or other replaceable or consumable components of the printer device 201), according to an example embodiment. The printing system 200 comprises the print apparatus 201 in communication with the replaceable device 210 via a communications bus 220. For ease of understanding, FIG. 2 shows the replaceable print apparatus component 210 as external to the print apparatus 201, though in some examples, the replaceable print apparatus component 210 may be housed within the printer device 201. In some cases, the replaceable device 210 is referred to as a "consumable" peripheral, because the replaceable device 210 (or component of the replaceable device 210) typically has a lifespan or period of usefulness that is less (in some examples, considerably less) than that of the printer device 201.

The print apparatus 201 may be any type of 2D print apparatus or 3D print apparatus that includes printer operating circuitry 207 for performing printing operations using the replaceable device 210. The print apparatus 201 facilitates printing of graphical and/or textural images on a print medium, such as paper, card stock, transparencies, Mylar, cloth, and the like. The print apparatus 201 includes, for example, an inkjet printer, a laser printer, or other types of printer devices. The printer device 201 includes the printer operating circuitry 207, a printer security circuit 203, and printer interface 205 for communicating with the replaceable device 210 via the bus 220.

The replaceable device 210 includes a consumable resource (e.g., ink, toner), situated in a reservoir 218 or other physical container. The replaceable device 210 includes consumable operating circuitry 216 for performing the printing functions according to the instructions received from the printer operating circuitry 207 of the print apparatus 201. The print apparatus component 210 may physically store the consumable resource (e.g., ink, toner, 3D print agent, 3D print build powder) in the reservoir 218, where the consumable may be intended to be replaced after substantial exhaustion. In some embodiments, the replaceable device 210 includes a print head or other dispensing component (not shown). Although FIG. 2 shows a single replaceable print apparatus component 210, embodiments may include a plurality of replaceable devices 210 in the printer device 201. For example, the printer device 201 or the replaceable device 210 comprises any number of print agent reservoirs 218 of different colors, multiple print heads, or other variations in the configuration of the printer device 201 or the replaceable device 210.

The bus 220 includes hardware components forming a communications link for carrying signals and digital information, such as message data, between the printer device 201 and the replaceable device 210. The bus 220 includes, for example, an electrical, optical, infrared, or other suitable signal information transfer media between the printer device 201 and the replaceable device 210, according to corresponding data communications protocols. The secure communications between the printer device 201 and replaceable device 210 may be accomplished via the bus 220 according to serial data bus protocols, such as Serial Peripheral Interface (SPI) protocol or Inter-Integrated Circuit (I2C) protocol.

Turning now to the printer device 201, the printer device 201 comprises one or more printer interfaces 205 for communicating via corresponding data busses 220. The printer interface 205 is a component of, or coupled to, the logic circuitry components of the printer operating circuitry 207 or the printer security circuit 203. The printer interface 205 includes various logic circuitry for performing processes allowing the printer device 201 to communicate signals or digital information with the replaceable device 210 via the bus 220. In operation, the components of the printer device 201 implement the printer interface 205 to encode or decode the data received or transmitted via the bus 220. For instance, in some cases, the printer operating circuitry 207 or the printer security circuit 203 of the printer device 201 is configured to encode the command message data for transmission via the printer interface 205 to the replaceable device 210 according to the particular communication protocol or standard of the bus 220. In some embodiments, for example, the printer interface 205 includes an I2C interface where the bus 220 includes an I2C-capable communications bus.

The printer security circuit 203 performs the various operations described herein for authenticated-encryption communications with the replaceable device 210, allowing the security circuit 203 of the printer device 201 to authenticate or validate the replaceable device 210 as compatible or permissible and communicate securely over the bus 220. In some cases, the security circuit 203 may generate command instructions for the replaceable device 210, such as the command signal for initiating or beginning a communication session, or instructions related to performing printing operations.

The security circuit 203 includes any processor, controller (or microcontroller), or logic device (or combination of logic devices) capable of performing the various processes described herein. The security circuit 203 may be situated on a dedicated printed circuit board (PCB) or integrated circuit (IC). Additionally or alternatively, components of the security circuit 203 may be situated on a PCB or IC with the components of the printer operating circuitry 207 or printer memory of the printer operating circuitry 207. Non-limiting examples of components of the security circuit 203 include the printer memory, central processing units (CPU), graphics processing units (GPU), application-specific integrated circuits (ASICs), field-programmable gate arrays (FPGAs), electronic logic gates, and registers, among other potential logic or storage components.

The printer operating circuitry 207 performs the various operations or functions intended for the printer device 201. The printer device 201 is a printing apparatus having the printer operating circuitry 207, which may include a controller device that receives, generates, or transmits command instructions (e.g., printing instructions) and controls operations of the replaceable device 210 to, for example, apply ink or toner on the print medium (e.g., paper) according to the printing command instructions. The printer operating circuitry 207 includes any processor, controller (or microcontroller), or logic device (or combination of logic devices) capable of performing the various processes described herein. The printer operating circuitry 207 may be situated on a dedicated printed circuit board (PCB) or integrated circuit (IC). Additionally or alternatively, components of the printer operating circuitry 207 may be situated on a PCB or IC with the components of the printer security circuit 203 or printer memory (not shown) of the printer operating circuitry 207. Non-limiting examples of components of the printer operating circuitry 207 include the printer memory, central processing units (CPU), graphics processing units (GPU), application-specific integrated circuits (ASICs), field-programmable gate arrays (FPGAs), electronic logic gates, and registers, among other potential logic or storage components.

In operation, the printer operating circuitry 207 may generate, send, receive, and process various types of instructions for a command-response communications sequence with the replaceable device 210. The printer operating circuitry 207 may generate various command instructions for execution by the replaceable device 210. The command instructions may include operational instructions related to the functions of the replaceable device 210 (e.g., read/write data, execute print job that applies ink or toner to print medium). The command instructions may include communications, overhead, or signaling instructions related to the inter-device communications administration, such as a command signal for initiating or beginning a communication session.

Turning now to the replaceable device 210, the replaceable device 210 comprises one or more consumable interface 214 for communicating via corresponding busses 220. The consumable interface 214 is a component of, or coupled to, the logic circuitry components of the consumable operating circuitry 216 or the consumable security circuit 212. The consumable interface 214 includes various logic circuitry for performing processes allowing the replaceable device 210 to communicate signals or digital information with the printer device 201 via the bus 220. In operation, the components of the replaceable device 210 implement the consumable interface 214 to encode or decode the message data received or transmitted via the bus 220. For instance, in some cases, the consumable security circuit 212 or the consumable operating circuitry 216 of the replaceable device 210 is configured to encode the response message data for transmission via the consumable interface 214 to the printer device 201 according to the particular communication protocol or standard of the bus 220. In some embodiments, for example, the consumable interface 214 includes an I2C interface where the bus 220 includes an I2C-capable communications bus.

The consumable security circuit 212 performs the various operations described herein for encrypted communications with the printer device 201 and for verifying the host device

101 as compatible or permissible. The consumable security circuit 212 includes any processor, controller (or microcontroller), or logic device (or combination of logic devices) capable of performing the various processes described herein. The consumable security circuit 212 may be situated on a dedicated printed circuit board (PCB) or integrated circuit (IC). Additionally or alternatively, components of the consumable security circuit 212 may be situated on a PCB or IC with the components of the consumable operating circuitry 216 or reservoir 218. Non-limiting examples of components of the consumable security circuit 212 include central processing units (CPU), graphics processing units (GPU), application-specific integrated circuits (ASICs), field-programmable gate arrays (FPGAs), electronic logic gates, and registers, among other potential logic or storage components.

The consumable operating circuitry 216 performs the various operations or functions intended for the replaceable device 210. The printer device 201 is a printing apparatus and the replaceable device 210 is a print cartridge having logic circuitry of the consumable operating circuitry 216 that receives various command instructions, such as printing command instructions, from the printer device 201. The consumable operating circuitry 216 may control operations of the print cartridge to apply ink or toner according to the instructions received from the printer device 201 via the bus 220. The consumable operating circuitry 216 includes any processor, controller (or microcontroller), or logic device (or combination of logic devices) capable of performing the various processes described herein. The consumable operating circuitry 216 may be situated on a dedicated printed circuit board (PCB) or integrated circuit (IC). Additionally or alternatively, components of the consumable operating circuitry 216 may be situated on a PCB or IC with the components of the consumable security circuit 212 or memory storage component (not shown). Non-limiting examples of components of the consumable operating circuitry 216 include the memory, central processing units (CPU), graphics processing units (GPU), application-specific integrated circuits (ASICs), field-programmable gate arrays (FPGAs), electronic logic gates, and registers, among other potential logic or storage components.

The consumable operating circuitry 216 performs data operations associated with the replaceable device 210 and to respond to command instructions from the printer operating circuitry 207 via the bus 220. For example, the printer operating circuitry 207 of the printer device 201 may transmit commands over the bus 220 to the consumable operating circuitry 216 to perform various printing operations. In some circumstances, for example, an instruction may comprise a "write" request (e.g., to write data to a memory location), or an instruction to perform an action, such as performing a measurement (e.g., ink level measurement), carrying out a printing task, and a data processing action, among others. In some cases, the printer operating circuitry 207 may send a command to the consumable operating circuitry 216 to perform an operation to load data into a consumable memory (e.g., a buffer and/or specific register of a memory), and, in response to a subsequent print apparatus command, the consumable operating circuitry 216 may transmit the data over the bus 220.

The replaceable device 210 includes a consumable resource reservoir 218. As mentioned, the printer device 201 includes any type of two-dimensional imaging apparatus and three-dimensional additive manufacturing apparatus, such as inkjet printers, dry toner printers, liquid toner printers, and 3D powder bed inkjet printers, for example. The replaceable device 210 includes any number of reservoir 218 as print material containers, such as ink tanks, ink bottles, inkjet printhead cartridges, dry toner reservoirs, liquid toner reservoirs, dry toner cartridges, and build material supplies; among other types of replaceable or consumable components that may or may not contain print materials, such as printheads (e.g., a thermal inkjet printhead).

FIG. 3 shows operations of a method 300 for authenticated-encryption communication between a host device and peripheral device via a data communications bus, according to an embodiment.

Each device includes various logic circuitry defining a security circuit for performing the various verification or authentication operations described herein. The devices may further include processing circuitry for performing the various mission-related functions of the particular device. For example, where the host device is a printing device and the peripheral device is a replaceable printing component device (e.g., replaceable device 210 of FIG. 2), the processing circuitry of the printing device may include a processor IC (e.g., CPU, GPU) or controller for driving the functions of the replaceable printing component. Likewise, the processing circuitry of the replaceable printing component may include a controller that drives a consumable resource (e.g., ink, toner) from a reservoir in accordance with instructions received from the processing circuitry of the printing device.

For ease of description and understanding, the operations described in the method 300 make reference to the host device or peripheral device, though the operations of the particular device are performed by certain logic devices or other circuitry, including the security circuitry or the processing circuitry.

The devices execute authenticated-encryption and authenticated-decryption operations to implement the verification and secrecy benefits of the authenticated-encryption communication described herein. When performing the authenticated-encryption or authenticated-decryption operations, the devices generally execute a symmetric encryption algorithm using any number of session keys, which are shared, symmetric, encryption keys, to encrypt or decrypt the instructions (e.g., command instruction, response instruction) exchanged between the devices. Each device may compute authentication tags (e.g., command tags or response tags) according to a preconfigured number of bytes. The device executes the symmetric encryption algorithm on initializing parameters, including a constant value or initializing constant. The symmetric encryption algorithm computes the command tag having the preconfigured number of bytes and ciphertext of initializing command instructions. The device parses the initial command tag into two portions: a shared subset; and a non-shared subset or discard subset (e.g., for determining an initial tag, the shared subset is discarded). The device stores the non-shared subset into the cache memory of the device for later reference.

For instance, the processing circuitry or the security circuitry of a sending device may generate plaintext of an instruction. In the authenticated-encryption operations, the security circuitry of sending device may apply the encryption algorithm on the plaintext of the instruction using the session key, thereby computing ciphertext of the instruction and an authentication tag. The sending device sends encrypted instruction data that includes the ciphertext of the instruction and a shared subset of the authentication tag. The sending device then transmits the encrypted instruction data to a receiving device. The receiving device implements the authenticated-decryption operations, which applies the effective inverse of the symmetric encryption algorithm using the session key on the encrypted instruction data, comprising the ciphertext of the instruction and shared subset of the authentication tag, thereby decrypting the ciphertext of the instruction to compute and recover the plaintext of the instruction and the non-shared subset of the authentication tag.

In operation 301, the host device sends an initiating command signal to the peripheral device for initiating a new communication session with the peripheral device, where the initiating command signal indicates a beginning of the communication session to the peripheral device. Before or after sending the initiating command signal to the peripheral device, the host device computes an initial command tag. The host device then stores a non-shared subset of the initial command tag into a cache memory.

The host device computes the initial command tag by, for example, performing authenticated-encryption functions, which includes applying the symmetric encryption algorithm on a set of preconfigured default or initialization parameters using the symmetric session key. These parameters include, for example, an initial IV and optional plaintext of command instruction, or any other preconfigured diversifying parameter values that are shared or otherwise implemented by both the host device and the peripheral device. The initial IV is constructed by concatenating or algorithmically combining a constant (CONST) or initializing constant (INIT_CONST) and the initialized command counter (cmd_cnt=0), though, in some implementations, the command counter is not used for the initial tag. The host device applies the symmetric encryption algorithm on the initial IV and optional plaintext initial command instructions (which may be NULL). The host device then outputs the initial command tag ($cmd\_tag_0$) having the preconfigured number of bytes and ciphertext of the initial command instruction (which may be NULL). The host device parses the initial command tag into two portions: a discard subset or shared subset of the initial command tag (MSB($cmd\_tag_0$)); and a non-shared subset of the initial command tag (LSB($cmd\_tag_0$)). The host device stores the non-shared subset into the cache memory of the host device for later reference, which the host device treats as the initial command tag. The host device treats the remaining subset of the initial command tag as a discard subset that the host device sets aside and does not store. In later iterations of the operations, the host device would ordinarily use the remaining subset of the command tag as a shared subset(MSB ($cmd\_tag_n$)).

An example operation for computing the initial command tag and initial IV may be represented as:

$$(C\_NULL, MSB(cmd\_tag_0) \| LSB(cmd\_tag_0) =$$
$$ALGO[SK](INIT\_CONST \| cmd\_cnt_0, P\_NULL).$$

In operation 303, the peripheral device receives the command signal from the host device indicating the beginning of the communication session. Before or after receiving the initiating command signal from the host device, the peripheral device computes an initial command tag. The peripheral device then stores a non-shared subset of the initial command tag into a cache memory. The peripheral device computes the initial IV and the initial command tag in the same manner, and the same pre-configured parameter values, used by the host device (as in operation 301). As before, the example operation for computing the initial command tag and initial IV may be represented as:

$$(\text{C\_NULL}, MSB(\text{cmd\_tag}_0) \,\|\, LSB(\text{cmd\_tag}_0)) =$$
$$ALGO[SK](\text{INIT\_CONST} \,\|\, \text{cmd\_cnt}_0, \text{P\_NULL}).$$

In operation 305, to begin the session, the peripheral device generates a Start Session Response as an initial response and sends encrypted initial response data. The peripheral device generates and sends the Start Session Response in response to receiving the initializing command signal received from the host device (as in operation 303). The peripheral device generates the Start Session Response $(\text{rsp}_0)$ as an initial response instruction that indicates, for example, the peripheral device is ready to proceed with the communication session of the method 300. In some implementations, the plaintext of the Start Session Response $(\text{p\_rsp}_0)$ includes a response code (rsp\_code) indicating, for example, the peripheral device is in a "ready" state. Optionally, the Start Session Response includes response parameters (rsp\_params) indicating, for example, various communication or configuration parameters governing or preconfiguring the communication protocols.

An example operation for generating the plaintext of the Start Session Response may be represented as: $\text{p\_rsp}_0 = \text{rsp\_code} \| \text{rsp\_params}$.

After generating the plaintext of the Start Session Response instruction, the peripheral device constructs an initial response IV $(\text{rsp\_iv}_0)$. The peripheral device may compute the initial response IV by concatenating or otherwise combining a preconfigured constant (CONST) or preconfigured response constant (RSP\_CONST), the non-shared subset of the initial command tag $(LSB(\text{cmd\_tag}_0))$, and the deterministic value, such as the command counter (cmd\_cnt=0). An example operation for generating the initial response IV may be represented as:

$$\text{rsp\_iv}_0 = \text{RSP\_CONST} \| LSB(\text{cmd\_tag}_0) \| \text{cmd\_cnt}.$$

The peripheral device applies the encryption algorithm and session on the plaintext of the Start Session Response $(\text{p\_rsp}_0)$ to compute the ciphertext of the Start Session Response $(\text{c\_rsp}_0)$ and an initial response tag $(\text{rsp\_tag}_0)$. The peripheral device partitions the initial response tag into a shared response tag $(MSB(\text{rsp\_tag}_0))$ and a discard tag $(LSB(\text{rsp\_tag}_0))$. The peripheral device sends encrypted Start Session Response data to the host device. The encrypted Start Session Response data comprises, for example, the ciphertext of the Start Session Response instruction and the shared response tag. An example operation for computing the ciphertext Start Session Response instruction and the response tag may be represented as:

$$(\text{c\_rsp}_0, MSB(\text{rsp\_tag}_0) \| LSB(\text{rsp\_tag}_0)) = ALGO[SK](\text{rsp\_iv}_0, \text{p\_rsp}_0).$$

In this example, the encrypted Start Session Response data includes the ciphertext $(\text{c\_rsp}_0)$ and the initial shared subset of the response tag $(MSB(\text{rsp\_tag}_0))$. The peripheral device then sends this encrypted Start Session Response data to the host device.

In operation 307, the host device verifies the Start Session Response data from the peripheral device and decrypts the encrypted Start Session Response data. To verify the encrypted Start Session Response data, the host device computes an initial response IV $(\text{rsp\_iv}_0)$ by concatenating or otherwise combining, for example, a preconfigured constant (CONST) or response constant (RSP\_CONST), the non-shared subset of the initial command tag $LSB(\text{cmd\_tag}_0)$, and the command count (cmd\_cnt=0). An example of constructing the initial response IV for authenticated-decryption by the host device may be represented as:

$$\text{rsp\_iv}_0 = \text{RSP\_CONST} \| LSB(\text{cmd\_tag}_0) \| \text{cmd\_cnt}.$$

After generating the initial response IV, the host device performs the authenticated-decryption operations to verify the initial shared response tag and decrypt the encrypted Start Session Response data. For instance, the host device applies the effective inverse of the encryption algorithm and the session key on the initial response IV $(\text{rsp\_iv}_0)$, the ciphertext of the Start Session Response instruction $(\text{c\_rsp}_0)$, and the shared subset of the initial response tag $(MSB(\text{rsp\_tag}_0))$. In the authenticated-decryption operation, the encryption algorithm computes and outputs the plaintext of the Start Session response instruction $(\text{p\_rsp}_0)$. The authenticated-decryption operation for verifying and decrypting the encrypted response data (e.g., encrypted Start Session response data) may be represented as:

$$\text{p\_rsp}_{cmd\_cnt} =$$
$$ALGO^{-1}[SK](\text{rsp\_iv}_{cmd\_cnt}, \text{c\_rsp}_{cmd\_cnt}, MSB(\text{rsp\_tag}_{cmd\_cnt})).$$

The symmetric encryption algorithm employed in the authenticated-decryption has the benefit of being applied against the response IV and the shared subset of the response tags, which are dependent upon earlier computations known to authorized host devices and authorized peripheral devices. As such, when the host device performs the authenticated-decryption functions on encrypted response data from the peripheral device, the successful decryption of the ciphertext response instruction may indicate to the host device that each device is necessarily verified or authenticated in the given iteration (such as operations 307 and 315).

In operation 309, the host device generates a plaintext command instruction and sends encrypted command message data to the peripheral device according to authenticated-encryption operations.

To generate the plaintext of the command instruction, the host device increments the command counter (cmd\_cnt+=1, where cmd\_cnt=1), or increments or updates another type of deterministic value (e.g., counter, clock, timer) parameter. The host device determines the command instruction $(\text{cmd}_1)$ according to various command inputs, such as a command code $(\text{cmd\_code}_1)$ and command parameters $(\text{cmd\_params}_1)$, among other optional parameters. The host device may concatenate or algorithmically combine these command inputs to construct the plaintext of the command instruction, which may represented as:

$$\text{p\_cmd}_{cmd\_cnt} = \text{cmd\_code}_{cmd\_cnt} \| \text{cmd\_params}_{cmd\_cnt}.$$

After generating the plaintext of the command instruction $(p\_cmd_1)$, the host device then computes a current or updated command IV $(cmd\_iv_1)$, the ciphertext of the command instruction, and the next command tag. The host device constructs the command IV $(cmd\_iv_1)$ by concatenating or combining a constant value (CONST) or command constant value (CMD_CONST), the non-shared portion of the prior or initial command tag $(LSB(cmd\_tag_0))$, and the now-updated command counter $(cmd\_cnt=1)$. The operations for constructing the command IVs may be represented as:

$$cmd\_iv_{cmd\_cnt} = CMD\_CONST \| LSB(cmd\_tag_{cmd\_cnt-1}) \| cmd\_cnt.$$

After computing the current command IV, the host device generates the encrypted command instruction data comprising ciphertext of the current command instruction and a current command tag. For instance, the host device may apply the encryption algorithm and session key on the current command IV $(cmd\_iv_1)$ and the plaintext of the command instruction $(p\_cmd_1)$, computes the ciphertext of the command instruction $(c\_cmd_1)$ and the next command tag $((MSB(cmd\_tag_1) \| LSB(cmd\_tag_1))$. The host device stores the non-shared subset of the command tag $((LSB(cmd\_tag_1))$ into the cache memory, and sends the shared subset of the current command tag $((MSB(cmd\_tag_1))$ to the peripheral device. The authenticated-encryption operations for computing the encrypted command data may be represented as:

$$\left(c\_cmd_{cmd\_cnt}, MSB(cmd\_tag_{cmd\_cnt}) \| LSB(cmd\_tag_{cmd\_cnt})\right) =$$
$$ALGO[SK](cmd\_iv_{cmd\_cnt}, p\_cmd_{cmd\_cnt}).$$

In operation 311, the peripheral device verifies the encrypted command instruction data and decrypts the encrypted command instruction data according to the authenticated-decryption operations. The peripheral device may construct a command IV, verify the command tag, and compute and recover the plaintext of the command instructions.

To construct the command IV, the peripheral device increments the command counter $(cmd\_cnt+=1$, where $cmd\_cnt=1)$ or updates the deterministic value. The peripheral device constructs the command IV $(cmd\_iv_1)$ by concatenating or combining a constant value (CONST) or command constant value (CMD_CONST), the non-shared portion of a prior command tag or initial command tag $(LSB(cmd\_tag_0))$, and the incremented command counter $(cmd\_cnt=1)$. The operations for constructing the command IV by the peripheral device may be represented as:

$$cmd\_iv_{cmd\_cnt} = CMD\_CONST \| LSB(cmd\_tag_{cmd\_cnt-1}) \| cmd\_cnt.$$

The authenticated-decryption operations performed by the peripheral device may apply the effective inverse of the symmetric encryption function, using the session key, on the current command IV $(cmd\_iv_1)$ and the encrypted command instruction data, which contains the ciphertext of the command instruction $(c\_cmd_1)$ and the shared portion of the current command tag $(MSB(cmd\_tag_1))$. The peripheral device then computes the plaintext of the command instruction $(p\_cmd_1)$ and the non-shared portion of the current command tag $(LSB(cmd\_tag_1))$. The authenticated-decryption operations for decrypting and verifying the encrypted command data may be represented as:

$$\left(p\_cmd_{cmd\_cnt}, LSB(cmd\_tag_{cmd\_cnt})\right) =$$
$$ALGO^{-1}[SK](cmd\_iv_{cmd\_cnt}, c\_cmd_{cmd\_cnt}, MSB(cmd\_tag_{cmd\_cnt})).$$

Notably, the authenticated-decryption functions performed by the peripheral device take the shared subset of the command tag $(MSB(cmd\_tag_{cmd\_cnt}))$ and should compute the corresponding non-shared portion of the command tag $(LSB(cmd\_tag_{cmd\_cnt}))$. The peripheral device computes the full command tag, compares the shared subset of the computed command tag against the shared subset received from the host device. If the peripheral device determines that the shared subset computed by the peripheral device matches the shared subset received from the host device, then the authenticated-decryption operations return the non-shared portion of the computed command tag. This verification function beneficially capitalizes on an organic mechanism for comparing and verifying that the host device and peripheral device generated the same command tag and are therefore both validated or authenticated devices. For instance, if the host and peripheral are configured to generate 16-byte authentication tags and 8-byte subsets, then the host device computed the 16-byte command tag and provided only the 8-byte shared subset of the command tag in the encrypted command instruction data (as in prior operation 309). The host device computed the 16-byte command tag using a collection of identical values or corresponding values (e.g., ciphertext of command instruction corresponding to plaintext of the command instruction) that the peripheral device uses. When the peripheral device applies the authenticated-decryption functions on the ciphertext of the command and the shared subset of the command tag, the encryption algorithm operates inversely to recover the plaintext of the command instruction and the non-shared portion of the command tag, thereby providing the peripheral device access to both subsets of the command tag presumably computed by the host device previously (in operation 309). As such, in some cases, the peripheral device may compare the shared subsets of the command tags computed by each of the devices. Additionally or alternatively, when the peripheral device performs the authenticated-decryption functions on encrypted command data from the host device, the successful decryption of the ciphertext command instruction may indicate to the peripheral device that each device is necessarily verified or authenticated in the given iteration (such as operations 309-311).

In operation 313, the peripheral device generates a response instruction and sends encrypted response instruction data to the host device. In particular, the peripheral device generates a plaintext response instruction and performs the authenticated-encryption functions for generating encrypted response data containing ciphertext of the response instruction (as in operation 305).

The peripheral device generates the response instruction according to various response inputs, such as a response code $(rsp\_code_1)$ and response parameters $(rsp\_params_1)$, among other optional inputs. As an example, the peripheral device may concatenate or algorithmically combine the response inputs to construct the plaintext of the response instruction (p_rsp$_1$), which may be represented as: p_rsp$_{cmd\_cnt}$=rsp_code$_{cmd\_cnt}$=rsp_params$_{cmd\_cnt}$.

After generating the plaintext of the response instruction, the peripheral device then computes a current or updated response IV. The peripheral device constructs the response IV (rsp_iv$_1$) by concatenating or combining a constant value (CONST) or response constant value (RSP_CONST), the non-shared portion of the current command tag (LSB(cmd_tag$_1$)), and the current command counter (cmd_cnt=1). As mentioned, constructing the response IVs may be represented as:

$$\text{rsp\_iv}_{cmd\_cnt} = \text{RSP\_CONST}\|LSB(\text{cmd\_tag}_{cmd\_cnt})\|\text{cmd\_cnt}.$$

After computing the current response IV (rsp_iv$_1$), the peripheral device generates the encrypted response data comprising ciphertext of the current response instruction (c_rsp$_1$) and a shared subset of a current response tag (MSB(rsp_tag$_1$)). The peripheral device may apply the encryption algorithm and session key on the current response IV (rsp_iv$_1$) and plaintext of the response instruction (p_rsp$_1$). The peripheral device computes the ciphertext of the response instruction (c_rsp$_1$) and the command tag (MSB(rsp_tag$_1$)||LSB(rsp_tag$_1$)). The peripheral device discards the non-shared subset of the response tag, and sends the shared subset of the current response tag (MSB(rsp_tag$_1$)) to the host device. As mentioned, the authenticated-encryption operations for computing the encrypted response data may be represented as:

$$(\text{c\_rsp}_{cmd\_cnt}, MSB(\text{rsp\_tag}_{cmd\_cnt})\|LSB(\text{rsp\_tag}_{cmd\_cnt})) =$$
$$ALGO[SK](\text{rsp\_iv}_{cmd\_cnt}, \text{p\_rsp}_{cmd\_cnt}).$$

The host device and peripheral device may continue to iteratively perform the operations 307-313 of the method 300 until the communication session ends.

FIG. 4 shows operations of a method 400 for authenticated-encryption communication between a host device and peripheral device via a data communications bus, according to an embodiment.

The method 400 of FIG. 4 is generally similar to the method 300 of FIG. 3. The difference is when the host device computes the initial command tag, when the peripheral device computes the initial command tag, and the method 400 of FIG. 4 the Start Session Response is sent as plaintext to establish the communication session, rather than as a encrypted instruction data (as in operation 305). In FIG. 3, the peripheral device and host device compute initial command tags contemporaneously, around the beginning of the communication session and the method 300. The peripheral device provides a Start Session Response instruction (in operation 305) to, in part, acknowledge the secure communication session. In FIG. 4, however, the host device and peripheral device exchange plaintext signals (in operations 401 and 403) to efficiently establish the communication session. The host device then proceeds to compute the initial command tag (in operation 405), and prepare and send the encrypted command instruction data (as in operation 407). After receiving the first encrypted command instruction from the host device, the peripheral device then computes the initial command tag (as in operation 409). Moreover, in FIG. 4, the host device must wait to compute the initial command tag based on parameters of the Start Session response; this is not the case in the FIG. 3 method Each device includes various logic circuitry defining a security circuit for performing the various verification or authentication operations described herein. The devices may further include processing circuitry for performing the various mission-related functions of the particular device. For example, where the host device is a printing device and the peripheral device is a replaceable printing component device (e.g., replaceable device 210 of FIG. 2), the processing circuitry of the printing device may includes a processor IC (e.g., CPU, GPU) or controller for driving the functions of the replaceable printing component. Likewise, the processing circuitry of the replaceable printing component may include a controller that drives a consumable resource (e.g., ink, toner) from a reservoir in accordance with instructions received from the processing circuitry of the printing device.

For ease of description and understanding, the operations described in the method 400 make reference to the host device or peripheral device, though the operations of the particular device are performed by certain logic devices or other circuitry, including the security circuitry or the processing circuitry.

The devices execute authenticated-encryption and authenticated-decryption operations to implement the verification and secrecy benefits of the authenticated-encryption communication described herein. When performing the authenticated-encryption or authenticated-decryption operations, the devices generally execute a symmetric encryption algorithm using any number of session keys, which are shared, symmetric, encryption keys, to encrypt or decrypt the instructions (e.g., command instruction, response instruction) exchanged between the devices. Each device may compute authentication tags (e.g., command tags or response tags) according to a preconfigured number of bytes. The device executes the symmetric encryption algorithm on initializing parameters, including a constant value or initializing constant. The symmetric encryption algorithm computes the command tag having the preconfigured number of bytes and ciphertext of initializing command instructions. The device parses the initial command tag into two portions: a shared subset; and a non-shared subset or discard subset (i.e., when computing the initial command tag, the shared subset is discarded as a discard subset). The device stores the non-shared subset into the cache memory of the device for later reference.

For instance, the processing circuitry or the security circuitry of a sending device may generate plaintext of an instruction. In the authenticated-encryption operations, the security circuitry of sending device may apply the encryption algorithm on the plaintext of the instruction using the session key, thereby computing ciphertext of the instruction and an authentication tag. The sending device sends encrypted instruction data that includes the ciphertext of the instruction and a shared subset of the authentication tag. The sending device then transmits the encrypted instruction data to a receiving device. The receiving device implements the authenticated-decryption operations, which applies the effective inverse of the symmetric encryption algorithm using the session key on the encrypted instruction data, comprising the ciphertext of the instruction and shared subset of the authentication tag, thereby decrypting the ciphertext of the instruction to compute and recover the plaintext of the instruction and the non-shared subset of the authentication tag.

In operation 401, the host device sends an initiating command signal to the peripheral device for initiating a new communication session with the peripheral device, where the initiating command signal indicates a beginning of the communication session to the peripheral device.

In operation 403, the peripheral device receives the initiating command signal and returns a plaintext initiating response instruction to the host device. The initiating response instruction may, for example, acknowledge receipt of the initiating command signal and indicate a ready state of the peripheral device. In some embodiments, the peripheral device returns a parameter that is used by the host device for the derivation and provision of a session key, which may inhibit the host device from computing the initial tag prior to this operation 403.

In operation 405, the host device computes an initial command tag. The host device then stores a non-shared subset of the initial command tag into a cache memory. The host device computes the initial command tag by, for example, applying the symmetric encryption algorithm on a set of preconfigured default or initialization parameters, using the symmetric session key. These parameters include, for example, a pre-configured constant value, a deterministic value (e.g., counter, timer, clock), an initializing or NULL command instruction, or any other preconfigured initial diversifying parameter values, which is shared or otherwise implemented by both the host device and the peripheral device.

The host device constructs the initial IV by concatenating or algorithmically combining a constant (CONST) or initializing constant (INIT_CONST) and the initialized command counter (cmd_cnt=0). The host device applies the symmetric encryption algorithm on the initial IV and optional plaintext initial command instructions (which may be NULL). The host device then outputs the initial command tag (cmd_tag$_0$) having the preconfigured number of bytes and ciphertext of the initial command instruction (which may be NULL). The host device parses the initial command tag into two portions: a discard subset or shared subset of the initial command tag (MSB(cmd_tag$_0$)); and a non-shared subset of the initial command tag (LSB(cmd_tag$_0$)). The host device stores the non-shared subset into the cache memory of the host device for later reference, which the host device treats as the initial command tag. The host device treats the remaining subset of the initial command tag as a discard subset that the host device sets aside and does not store. In later iterations of the operations, the host device would ordinarily use the remaining subset of the command tag as a shared subset (MSB(cmd_tag$_n$)). An example operation for computing the initial command tag and initial IV may be represented as:

$$(\text{C\_NULL}, MSB(\text{cmd\_tag}_0)$$

$$\| LSB(\text{cmd\_tag}_0) = ALGO[SK](\text{INIT\_CONST} \| \text{cmd\_cnt}_0, \text{P\_NULL}).$$

In operation 407, the host device generates a plaintext command instruction and sends encrypted command message data to the peripheral device according to authenticated-encryption operations.

To generate the plaintext of the command instruction, the host device increments the command counter (cmd_cnt+=1, where cmd_cnt=1), or increments or updates another type of deterministic value parameter. The host device determines the command instruction (cmd$_1$) according to various command inputs, such as a command code (cmd_code$_1$) and command parameters (cmd_params$_1$), among other optional parameters. The host device may concatenate or algorithmically combine these command inputs to construct the plaintext of the command instruction, which may represented as:

$$\text{p\_cmd}_{cmd\_cnt} = \text{cmd\_code}_{cmd\_cnt} \| \text{cmd\_params}_{cmd\_cnt}.$$

After generating the plaintext of the command instruction (p_cmd$_1$), the host device then computes a current or updated command IV (cmd_iv$_1$), the ciphertext of the command instruction, and the next command tag. The host device constructs the command IV (cmd_iv$_1$) by concatenating or combining a constant value (CONST) or command constant value (CMD_CONST), the non-shared portion of the prior or initial command tag (LSB(cmd_tag$_0$)), and the now-updated command counter (cmd_cnt=1). The operations for constructing the command IVs may be represented as:

$$\text{cmd\_iv}_{cmd\_cnt} = \text{CMD\_CONST} \| LSB(\text{cmd\_tag}_{cmd\_cnt-1}) \| \text{cmd\_cnt}.$$

After computing the current command IV, the host device generates the encrypted command instruction data comprising ciphertext of the current command instruction and a current command tag. For instance, the host device may apply the encryption algorithm and session key on the current command IV (cmd_iv$_1$) and the plaintext of the command instruction (p_cmd$_1$), computes the ciphertext of the command instruction (c_cmd$_1$) and the next command tag ((MSB(cmd_tag$_1$)\|LSB(cmd_tag$_1$)). The host device stores the non-shared subset of the command tag ((LSB (cmd_tag$_1$)) into the cache memory, and sends the shared subset of the current command tag ((MSB(cmd_tag$_1$)) to the peripheral device. The authenticated-encryption operations for computing the encrypted command data may be represented as:

$$(\text{c\_cmd}_{cmd\_cnt}, MSB(\text{cmd\_tag}_{cmd\_cnt}) \| LSB(\text{cmd\_tag}_{cmd\_cnt})) =$$

$$ALGO[SK](\text{cmd\_iv}_{cmd\_cnt}, \text{p\_cmd}_{cmd\_cnt}).$$

In operation 409, the peripheral device computes an initial command tag. The peripheral device then stores a non-shared subset of the initial command tag into a cache memory. The peripheral device computes the initial IV and the initial command tag in the same manner, and the same pre-configured parameter values, used by the host device (as in operation 405). As before, the operation for computing the initial command tag and initial IV may be represented as:

$$(\text{C\_NULL}, MSB(\text{cmd\_tag}_0)$$

$$\| LSB(\text{cmd\_tag}_0) = ALGO[SK](\text{INIT\_CONST} \| \text{cmd\_cnt}_0, \text{P\_NULL}).$$

In operation 411, the peripheral device verifies the encrypted command instruction data and decrypts the encrypted command instruction data according to the authenticated-decryption operations. The peripheral device may construct a command IV, verify the command tag, and compute the plaintext of the command instructions.

To construct the command IV, the peripheral device increments the command counter (cmd_cnt+=1, where cmd_cnt=1) or updates the deterministic value value. The peripheral device constructs the command IV (cmd_iv$_1$) by concatenating or combining a constant value (CONST) or command constant value (CMD_CONST), the non-shared portion of a prior command tag or initial command tag (LSB(cmd_tag$_0$)), and the incremented command counter (cmd_cnt=1). The operations for constructing the command IV by the peripheral device may be represented as:

$$\text{cmd\_iv}_{cmd\_cnt} = \text{CMD\_CONST} \parallel LSB(\text{cmd\_tag}_{cmd\_cnt-1}) \parallel \text{cmd\_cnt}.$$

The authenticated-decryption operations performed by the peripheral device may apply the effective inverse of the symmetric encryption function, using the session key, on the current command IV (cmd_iv$_1$) and the encrypted command instruction data, which contains the ciphertext of the command instruction (c_cmd$_1$) and the shared portion of the current command tag (MSB(cmd_tag$_1$)). The peripheral device then computes the plaintext of the command instruction (p_cmd$_1$) and the non-shared portion of the current command tag (LSB(cmd_tag$_1$)). The authenticated-decryption operations for decrypting and verifying the encrypted command data may be represented as:

$$\left(\text{p\_cmd}_{cmd\_cnt}, LSB(\text{cmd\_tag}_{cmd\_cnt})\right) =$$
$$ALGO^{-1}[SK]\left(\text{cmd\_iv}_{cmd\_cnt}, \text{c\_cmd}_{cmd\_cnt}, MSB(\text{cmd\_tag}_{cmd\_cnt})\right).$$

Notably, the authenticated-decryption functions performed by the peripheral device take the shared subset of the command tag (MSB(cmd_tag$_{cmd\_cnt}$)) and should compute the corresponding non-shared portion of the command tag (LSB(cmd_tag$_{cmd\_cnt}$)). The peripheral device computes the full command tag, compares the shared subset of the computed command tag against the shared subset received from the host device. If the peripheral device determines that the shared subset computed by the peripheral device matches the shared subset received from the host device, then the authenticated-decryption operations return the non-shared portion of the computed command tag. This verification function beneficially capitalizes on an organic mechanism for the comparing and verifying that the host device and peripheral device generated the same command tag and are therefore both validated or authenticated devices. For instance, if the host and peripheral are configured to generate 16-byte authentication tags and 8-byte subsets, then the host device computed the 16-byte command tag and provided only the 8-byte shared subset of the command tag in the encrypted command instruction data. The host device computed the 16-byte command tag using a collection of identical values or corresponding values (e.g., ciphertext of command instruction corresponding to plaintext of the command instruction) that the peripheral device uses. When the peripheral device applies the authenticated-decryption functions on the ciphertext of the command and the shared subset of the command tag, the encryption algorithm operates inversely to recover the plaintext of the command instruction and the non-shared portion of the command tag, thereby providing the peripheral device access to both subsets of the command tag presumably computed by the host device previously. As such, in some cases, the peripheral device may compare the shared subsets of the command tags computed by each of the devices. Additionally or alternatively, when the peripheral device performs the authenticated-decryption functions on encrypted command data from the host device, the successful decryption of the ciphertext command instruction may indicate to the peripheral device that each device is necessarily verified or authenticated in the given iteration.

In operation 413, the peripheral device generates a response instruction and sends encrypted response instruction data to the host device. In particular, the peripheral device generates a plaintext response instruction and performs the authenticated-encryption functions for generating encrypted response data containing ciphertext of the response instruction.

The peripheral device generates the request instruction (rsp) according to various response inputs, such as a response code (rsp_code) and response parameters (rsp_params), among other optional inputs. The host device may concatenate the command inputs to construct the plaintext of the command instruction (p_rsp), represented as:

$$\text{p\_rsp}_{cmd\_cnt} = \text{rsp\_code} \parallel \text{rsp\_params}.$$

After generating the plaintext of the response instruction, the peripheral device then computes a response IV, the ciphertext of the response instruction, and the next response tag. The peripheral device constructs the response IV (rsp_iv$_1$) by concatenating or combining a constant value (CONST) or response constant value (RSP_CONST), the non-shared portion of the current command tag (LSB(cmd_tag$_1$)), and the command counter (cmd_cnt=1). As mentioned, constructing the response IVs may be represented as:

$$\text{rsp\_iv}_{cmd\_cnt} = \text{RSP\_CONST} \parallel LSB(\text{cmd\_tag}_{cmd\_cnt}) \parallel \text{cmd\_cnt}.$$

After computing the current response IV (rsp_iv$_1$), the peripheral device generates the encrypted response data comprising ciphertext of the current response instruction (c_rsp$_1$) and a shared subset of a current response tag (MSB(rsp_tag$_1$)). The peripheral device may apply the encryption algorithm and session key on the current response IV (rsp_iv$_1$) and plaintext of the response instruction (p_rsp$_1$). The peripheral device computes the ciphertext of the response instruction (c_rsp$_1$) and the command tag (MSB(rsp_tag$_1$)∥LSB(rsp_tag$_1$)). The peripheral device discards the non-shared subset of the response tag, and sends the shared subset of the current response tag (MSB(rsp_tag$_1$)) to the host device. As mentioned, the authenticated-encryption operations for computing the encrypted response data may be represented as:

$$\left(\text{c\_rsp}_{cmd\_cnt}, MSB(\text{rsp\_tag}_{cmd\_cnt}) \parallel LSB(\text{rsp\_tag}_{cmd\_cnt})\right) =$$
$$ALGO[SK]\left(\text{rsp\_iv}_{cmd\_cnt}, \text{p\_rsp}_{cmd\_cnt}\right).$$

The host device and peripheral device may continue to iteratively perform the authenticated-encryption operations and authenticated-decryption operations of the method 400, until the communication session ends.

Figure 5:
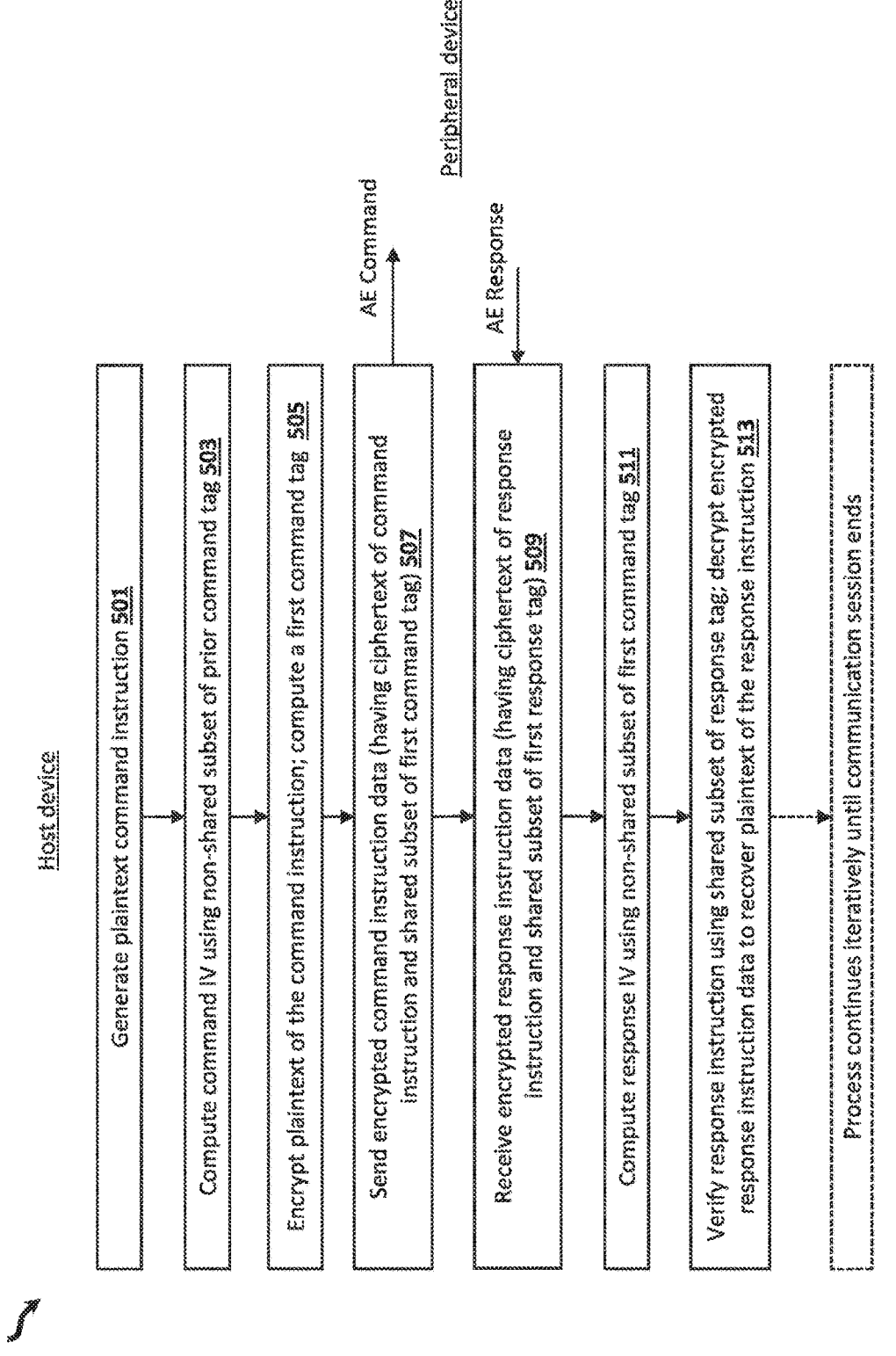
FIG. 5 shows operations of a method for a host device to verify or authenticate a peripheral device during a communication session established over a communication bus, according to an embodiment.

With reference to FIGS. 5-6, flow diagrams show operations of methods 500-600 of authenticated-encryption communications, according to embodiments. The features and functions described provide additional descriptions and examples about operations performed by the host device or the peripheral device. Moreover, FIGS. 5-6 are described with respect to operations following the establishment of the communication session and the initial command tags, and may represent circumstances in which there is an ongoing command-response communication sequence between the host device and the peripheral device, such as the communication sessions initiated in FIG. 3 or in FIG. 4.

Each device includes various logic circuitry defining a security circuit for performing the various verification or authentication operations described herein. The devices may further include processing circuitry for performing the various mission-related functions of the particular device. For example, where the host device is a printing device and the peripheral device is a replaceable printing component device (e.g., replaceable device 210 of FIG. 2), the processing circuitry of the printing device may includes a processor IC (e.g., CPU, GPU) or controller for driving the functions of the replaceable printing component. Likewise, the processing circuitry of the replaceable printing component may include a controller that drives a consumable resource (e.g., ink, toner) from a reservoir in accordance with instructions received from the processing circuitry of the printing device.

For ease of description and understanding, the operations described in the methods 500-600 make reference to a host device or peripheral device, though the operations of the particular device are performed by certain logic devices or other circuitry, including the security circuitry or the processing circuitry.

The devices generally execute a symmetric encryption algorithm using any number of shared, symmetric, encryption keys (referred to as "session keys"), to encrypt or decrypt the instructions (e.g., command instruction, response instruction) exchanged between the devices. For instance, the processing circuitry or the security circuitry of a sending device may generate plaintext of an instruction. The security circuitry of a sending device may apply the encryption algorithm on the plaintext of the instruction using the session key, thereby computing ciphertext of the instruction as a component of encrypted instruction data. The sending device then transmits the encrypted instruction data to a receiving device, which applies the effective inverse of the symmetric encryption (i.e., decryption) algorithm and the symmetric session key on the encrypted instruction data, thereby decrypting the ciphertext of the instruction to compute and recover the plaintext of the instruction.

Each device may compute authentication tags (e.g., command tags or response tags) according to a preconfigured number of bytes. The device executes the symmetric encryption algorithm on initializing parameters, including a constant value or initializing constant. The symmetric encryption algorithm computes the initial command tag having the preconfigured number of bytes and ciphertext of initializing command instructions, which may be NULL. The device parses the initial command tag into two portions: a discard subset or shared subset; and a non-shared subset. The device stores the non-shared subset into the cache memory of the device for later reference. In later iterations of the operations, the device would ordinarily use the remaining subset of a command tag as a shared subset, but the device treats the remaining subset of the initial command tag as a discard subset that the device sets aside and does not store. In some embodiments, the device initializes a command counter value that increments in certain operations, such as generating or verifying commands. The device then references the command counter when, for example, computing an IV, command tag, or response tag, among other uses.

Each device (e.g., host device, peripheral device) computes an initial command tag by, for example, applying the symmetric encryption algorithm on the set of preconfigured default or initialization parameters, using the symmetric session key. These parameters include, for example, a preconfigured constant value, a deterministic value (e.g., counter, timer, clock), an initializing or null command instruction, or any other preconfigured initial diversifying parameter values that are shared or otherwise implemented by both the host device and the peripheral device. An example an authenticated-encryption operation for computing the initial command tag and initial IV may be represented as:

$$(C\_NULL, MSB(\text{cmd\_tag}_0) \| LSB(\text{cmd\_tab}_0) =$$
$$ALGO[SK](\text{INIT\_CONST} \| \text{cmd\_cnt}_0, P\_NULL).$$

FIG. 5 shows operations of a method 500 for a host device to verify or authenticate a peripheral device during a communication session established over a communication bus, according to an embodiment. Each device includes various logic circuitry defining a security circuit for performing the various verification or authentication operations described herein. The devices may further include processing circuitry for performing the various mission-related functions of the particular device.

In operation 501, the host device generates a plaintext command instruction. The host device increments the command counter (cmd_cnt+=1, where cmd_cnt=1). The host device determines the command instruction ($\text{cmd}_1$) according to various command inputs, such as a command code (cmd_code) and command parameters ($\text{cmd\_params}_1$), among other optional inputs. To construct the plaintext of the command instruction ($\text{p\_cmd}_1$) the host device concatenates the command inputs, which may be represented as:

$$\text{p\_cmd}_{cmd\_cnt} = \text{cmd\_code}_{cmt\_cnt} \| \text{cmd\_params}_{cmt\_cnt}.$$

In operation 503, the host device computes a first command IV. The host device computes the first command IV using a non-shared subset of a prior or initial command tag, such as the command tag of a previous iteration or initial command tag, and a constant value or command constant value. For example, the host device constructs the first command IV ($\text{cmd\_iv}_1$) by concatenating a command constant value (CMD_CONST), the non-shared portion of the initial command tag ($LSB(\text{cmd\_tag}_0)$), and the current command counter (cmd_cnt=1). The operations for constructing the command IVs may be represented as:

$$\text{cmd\_iv}_{cmd\_cnt} = \text{CMD\_CONST} \| LSB(\text{cmd\_tag}_{cmd\_cnt-1}) \| \text{cmd\_cnt}.$$

In operation 505, the host device encrypts the plaintext of the command instruction and computes a first command tag. The host device applies the encryption algorithm, using the session key, on the first command IV, and the plaintext of the command instruction. As output, the host device computes the ciphertext of the command instruction ($\text{c\_cmd}_1$) and an updated command tag ($MSB(\text{cmd\_tag}_1)\|LSB(\text{cmd\_tag}_1)$). The host device generates encrypted command instruction data containing the ciphertext of the command instruction ($c\_cmd_1$) and the full command tag. The host device stores the non-shared subset of the command tag ($LSB(cmd\_tag_1)$) into the cache memory of the host device. An example authenticated-encryption operation for computing the encrypted command data may be represented as:

$$\left(c\_cmd_{cmd\_cnt}, \left(MSB(cmd\_tag_{cmd\_cnt}) \| LSB(cmd\_tag_{cmd\_cnt})\right)\right) = \\ ALGO[SK](cmd\_iv_{cmd\_cnt}, p\_cmd_{cmd\_cnt}).$$

In operation 507, the host device sends the encrypted command instruction data to the peripheral device via a data bus. The encrypted command instruction data comprises the ciphertext of the command instruction and the shared subset of the command tag.

In operation 509, the host device receives encrypted response instruction data from the peripheral device. The encrypted response instruction data comprises, for example, ciphertext of a response instruction ($c\_rsp$) and a shared portion of a response tag ($MSB(rsp\_tag)$).

In operation 511, the host device computes a first response IV. The host device computes the first response IV using a non-shared subset of the current command tag, a constant value or response constant value, and the command counter. For example, the host device constructs the first response IV ($rsp\_iv_1$) by concatenating a response constant value ($RSP\_CONST$), the non-shared portion of the current command tag ($LSB(cmd\_tag_1)$), and the current command counter ($cmd\_cnt=1$). The operations for constructing the response IVs may be represented as:

$$rsp\_iv_{cmd\_cnt} = RSP\_CONST \| LSB(cmd\_tag_{cmd\_cnt}) \| cmd\_cnt.$$

In operation 513, the host device verifies the response tag based on the shared portion of the response tag and decrypts the encrypted response instruction data to recover plaintext of the response instruction. The host device performs the authenticated-decryption operations to verify the response tag and decrypt the encrypted response instruction data. The host device applies the effective inverse of the encryption algorithm, using the session key, on the first response IV ($rsp\_iv_1$), the ciphertext of the response instruction ($c\_rsp_1$), and the shared subset of the initial response tag ($MSB(rsp\_tag_1)$). In the authenticated-decryption operation, the encryption algorithm computes and outputs the plaintext of the response instruction ($p\_rsp_1$). The authenticated-decryption operation for verifying and decrypting the encrypted response data (e.g., encrypted Start Session Response data; encrypted response instruction data) may be represented as:

$$p\_rsp_{cmd\_cnt} = \\ ALGO^{-1}[SK](rsp\_iv_{cmd\_cnt}, c\_rsp_{cmd\_cnt}, MSB(rsp\_tag_{cmd\_cnt})).$$

The symmetric encryption algorithm employed in the authenticated-decryption has the benefit of being applied against the response IV and the shared subset of the response tags, which are dependent upon earlier computations known to authorized host devices and authorized peripheral devices. As such, when the host device performs the authenticated-decryption functions on encrypted response data from the peripheral device, the successful decryption of the ciphertext response instruction may indicate to the host device that each device is necessarily verified or authenticated in the given iteration.

The host device may continue to iteratively perform the authenticated-encryption and authenticated-decryption operations of the method 500 until the communication session ends.

FIG. 6 shows operations of a method 600 for a peripheral device to verify or authenticate a host device during a communication session established over a communication bus, according to an embodiment. Each device includes various logic circuitry defining a security circuit for performing the various verification or authentication operations described herein. The devices may further include processing circuitry for performing the various mission-related functions of the particular device.

In operation 601, the peripheral device receives encrypted command instruction data from the host device via a channel of a data communications bus. The encrypted command instruction data comprises ciphertext of command instruction and shared subset of current command tag.

In operation 603, the peripheral device computes a command IV using non-shared subset of prior command tag. The peripheral device may construct the command IV for authenticated-decryption operation to verify the encrypted command instruction data using a command tag, and compute and recover the plaintext of the command instructions To construct the command IV, the peripheral device increments the command counter ($cmd\_cnt+=1$, where $cmd\_cnt=1$) or updates the deterministic value. The peripheral device constructs the command IV ($cmd\_iv_1$) by concatenating or combining a constant value ($CONST$) or command constant value ($CMD\_CONST$), the non-shared portion of a prior command tag or initial command tag ($LSB(cmd\_tag_0)$), and the incremented command counter ($cmd\_cnt=1$). The operations for constructing the command IV by the peripheral device may be represented as:

$$cmd\_iv_{cmd\_cnt} = CMD\_CONST \| LSB(cmd\_tag_{cmd\_cnt-1}) \| cmd\_cnt.$$

In operation 605, the peripheral device verifies the command instruction and decrypts the command instruction data. For instance, the authenticated-decryption operations performed by the peripheral device may apply the effective inverse of the symmetric encryption function, using the session key, on the current command IV ($cmd\_iv_1$) and the encrypted command instruction data, which contains the ciphertext of the command instruction ($c\_cmd_1$) and the shared portion of the current command tag ($MSB(cmd\_tag_1)$). The peripheral device then computes the plaintext of the command instruction ($p\_cmd_1$) and the non-shared portion of the current command tag ($LSB(cmd\_tag_1)$). The authenticated-decryption operations for decrypting and verifying the encrypted command data may be represented as:

$$\left(p\_cmd_{cmd\_cnt}, LSB(cmd\_tag_{cmd\_cnt})\right) = \\ ALGO^{-1}[SK](cmd\_iv_{cmd\_cnt}, c\_cmd_{cmd\_cnt}, MSB(cmd\_tag_{cmd\_cnt})).$$

As mentioned previously, the authenticated-decryption functions performed by the peripheral device take the shared subset of the command tag ($MSB(cmd\_tag_{cmd\_cnt})$) and should compute the corresponding non-shared portion of the command tag ($LSB(cmd\_tag_{cmd\_cnt})$). The peripheral device computes the full command tag, compares the shared subset of the computed command tag against the shared subset received from the host device. If the peripheral device determines that the shared subset computed by the peripheral device matches the shared subset received from the host device, then the authenticated-decryption operations return the non-shared portion of the computed command tag. This verification function beneficially capitalizing on an organic mechanism for comparing and verifying that the host device and peripheral device generated the same command tag and are therefore both validated or authenticated devices. For instance, if the host and peripheral are configured to generate 16-byte authentication tags and 8-byte subsets, then the host device computed the 16-byte command tag and provided only the 8-byte shared subset of the command tag in the encrypted command instruction data. The host device computed the 16-byte command tag using a collection of identical values or corresponding values (e.g., ciphertext of command instruction corresponding to plaintext of the command instruction) that the peripheral device uses. When the peripheral device applies the authenticated-decryption functions on the ciphertext of the command and the shared subset of the command tag, the encryption algorithm operates inversely to recover the plaintext of the command instruction and the non-shared portion of the command tag, thereby providing the peripheral device access to both subsets of the command tag presumably computed by the host device previously. As such, in some cases, the peripheral device may compare the shared subsets of the command tags computed by each of the devices. Additionally or alternatively, when the peripheral device performs the authenticated-decryption functions on encrypted command data from the host device, the successful decryption of the ciphertext command instruction may indicate to the peripheral device that each device is necessarily verified or authenticated in the given iteration.

In operation 607, the peripheral device generates plaintext of a response instruction. The peripheral device generates the response instruction according to various response inputs, such as a response code ($rsp\_code_1$) and response parameters ($rsp\_params_1$), among other optional inputs. As an example, the peripheral device may concatenate or algorithmically combine the response inputs to construct the plaintext of the response instruction ($p\_rsp_1$), which may be represented as:
$p\_rsp_{cmd\_cnt} = rsp\_code_{cmd\_cnt} \| rsp\_params_{cmd\_cnt}$.

In operation 609, the peripheral device computes a response IV. The peripheral device constructs the response IV ($rsp\_iv_1$) by concatenating or combining a constant value (CONST) or response constant value (RSP_CONST), the non-shared portion of the current command tag ($LSB(cmd\_tag_1)$), and the current command counter ($cmd\_cnt=1$). As mentioned, constructing the response IVs may be represented as:

$$rsp\_iv_{cmd\_cnt} = RSP\_CONST \| LSB(cmd\_tag_{cmd\_cnt}) \| cmd\_cnt.$$

In operation 611, the peripheral device encrypts the plaintext of the response instruction and computes a response tag. For instance, the peripheral device generates the encrypted response data comprising ciphertext of the current response instruction (c_rsp) and a shared subset of a current response tag ($MSB(rsp\_tag_1)$). The peripheral device may apply the encryption algorithm and session key on the current response IV ($rsp\_iv_1$) and plaintext of the response instruction ($p\_rsp_1$). The peripheral device computes the ciphertext of the response instruction ($c\_rsp_1$) and the command tag ($MSB(rsp\_tag_1) \| LSB(rsp\_tag_1)$). The peripheral device discards the non-shared subset of the response tag, and sends the shared subset of the current response tag ($MSB(rsp\_tag_1)$) to the host device (as in later step 613). As mentioned, the authenticated-encryption operations for computing the encrypted response data may be represented as:

$$(c\_rsp_{cmd\_cnt}, MSB(rsp\_tag_{cmd\_cnt}) \| LSB(rsp\_tag_{cmd\_cnt})) =$$
$$ALGO[SK](rsp\_iv_{cmd\_cnt}, p\_rsp_{cmd\_cnt}).$$

In operation 613, the peripheral device sends the encrypted response instruction data to the host device, via the channel of the data communications bus. The encrypted response instruction data comprises the ciphertext of the response instruction and shared subset of the response tag.

The peripheral device may continue to iteratively perform the authenticated-encryption and authenticated-decryption operations of the method 600 until the communication session ends.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, attributes, or memory contents. Information, arguments, attributes, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

In some embodiments, a logic device for peripheral authentication includes a bus interface configured to communicate data with a host device during operation. The logic device includes an authenticating circuit. The authenticating circuit may be configured to compute a first initialization vector for decrypting encrypted command data from the host device. The encrypted command data includes ciphertext of a command instruction and a shared subset of a current command tag. The first initialization vector is computed based upon a non-shared subset of a prior command tag. The authenticating circuit may be configured to decrypt the encrypted command data using the first initialization vector, thereby obtaining plaintext of the command instruction and the non-shared subset of the current command tag. The authenticating circuit may be configured to generate encrypted response data comprising ciphertext of a response instruction and a current response tag.

In some implementations, plaintext of the response instruction is obtainable to the host device using an initialization vector based upon the non-shared subset of the current command tag.

In some implementations, the response instruction indicates a response code. The response instruction is constructed based upon the response code.

In some implementations, the authenticating circuit is configured to compute the first initialization vector based upon the non-shared subset of the prior command tag and a pre-configured constant value.

In some implementations, the authenticating circuit is configured to compute the first initialization vector based upon the non-shared subset of the prior command tag and a deterministic value.

In some implementations, when generating the encrypted response data, the authenticating circuit is configured to compute a second initialization vector based upon the non-shared subset of the current command tag and a pre-configured constant. The authenticating circuit is configured to encrypt plaintext of the response instruction using the second initialization vector to generate the ciphertext of the response instruction.

In some implementations, when generating the encrypted response data, the authenticating circuit is configured to compute a second initialization vector based upon the non-shared subset of the current command tag and a deterministic value. The authenticating circuit is configured to encrypt plaintext of the response instruction using the second initialization vector to generate the ciphertext of the response instruction.

In some implementations, the authenticating circuit is further configured to verify the encrypted command data received from the host device based upon comparing the current command tag associated with the encrypted command data including the shared subset of the current command tag received from the host device against the current command tag obtained by the authenticating circuit including the non-shared subset of the current command tag computed by the authenticating circuit.

In some implementations, the encrypted command data is encrypted based upon a symmetric encryption algorithm. The authenticating circuit decrypts the encrypted command data using the symmetric encryption algorithm.

In some implementations, the encrypted command data is encrypted based upon a session key. The authenticating circuit decrypts the encrypted command data using the session key.

In some implementations, the authenticating device is further configured to obtain a plurality of session keys to apply to the data of a plurality of communication exchanges with the host device.

In some implementations, the logic device further includes a non-transitory memory configured to store a plurality of command tags. Each command tag and each response tag has a preconfigured length defining an amount of bytes.

In some implementations, when generating the encrypted response data, the authenticating circuit is configured to compute the current response tag having the shared subset of the current response tag and a discarded subset of the current response tag. The authenticating circuit is configured to transmit the encrypted response data to the host device, the encrypted response data including the ciphertext of the response instruction and the shared subset of the response tag. The authenticating circuit discards the discarded subset of the current response tag.

In some implementations, the bus interface is configured for at least one of Serial Peripheral Interface (SPI), Inter-Integrated Circuit (I2C), Peripheral Component Interconnect (PCI), PCI express (PCIe), Infiniband, or USB.

In some embodiments, a print cartridge includes a print material supply chamber, a bus interface coupled to a host device, and an authenticating circuit. The authenticating circuit is configured to compute a first initialization vector for decrypting encrypted command data from the host device. The encrypted command data includes ciphertext of a command instruction and a shared subset of a current command tag. The first initialization vector is computed based upon a non-shared subset of a prior command tag. The authenticating circuit is configured to decrypt the encrypted command data using the first initialization vector, thereby obtaining plaintext of the command instruction and the non-shared subset of the current command tag. The authenticating circuit is configured to generate encrypted response data including ciphertext of a response instruction and a current response tag. The authenticating circuit is configured to transmit the encrypted response data to the host device via the bus interface to authenticate the print cartridge.

In some implementations, plaintext of the response instruction is obtainable to the host device using an initialization vector based upon the non-shared subset of the current command tag.

In some implementations, the response instruction indicates a response code. The response instruction is constructed based upon the response code.

In some implementations, the authenticating circuit is configured to compute the first initialization vector based upon the non-shared subset of the prior command tag and a pre-configured constant value In some implementations, the authenticating circuit is configured to compute the first initialization vector based upon the non-shared subset of the prior command tag and a deterministic value.

In some implementations, when generating the encrypted response data, the authenticating circuit is configured to compute a second initialization vector based upon the non-shared subset of the current command tag and a pre-configured constant. The authenticating circuit is configured to encrypt plaintext of the response instruction using the second initialization vector to generate the ciphertext of the response instruction.

In some implementations, when generating the encrypted response data, the authenticating circuit is configured to compute a second initialization vector based upon the non-shared subset of the current command tag and a deterministic value. The authenticating circuit is configured to encrypt plaintext of the response instruction using the second initialization vector to generate the ciphertext of the response instruction.

In some implementations, the authenticating circuit is further configured to verify the encrypted command data received from the host device based upon comparing the current command tag associated with the encrypted command data including the shared subset of the current command tag received from the host device against the current command tag obtained by the authenticating circuit including the non-shared subset of the current command tag computed by the authenticating circuit.

In some implementations, the encrypted command data is encrypted based upon a symmetric encryption algorithm. The authenticating circuit decrypts the encrypted command data using the symmetric encryption algorithm.

In some implementations, the encrypted command data is encrypted based upon a session key. The authenticating circuit decrypts the encrypted command data using the session key.

In some implementations, the authenticating circuit is further configured to obtain a plurality of session keys to apply to the data of a plurality of communication exchanges with the host device.

In some implementations, the print cartridge further includes or couples to a non-transitory memory configured to store a plurality of command tags. Each command tag and each response tag has a preconfigured length defining an amount of bytes.

In some implementations, when generating the encrypted response data, the authenticating circuit is configured to compute the current response tag having the shared subset of the current response tag and a discarded subset of the current response tag. The authenticating circuit is configured to transmit the encrypted response data to the host device. The encrypted response data includes the ciphertext of the response instruction and the shared subset of the response tag. The authenticating circuit discards the discarded subset of the current response tag.

In some implementations, the bus interface is configured for at least one of Serial Peripheral Interface (SPI), Inter-Integrated Circuit (I2C), Peripheral Component Interconnect (PCI), PCI express (PCIe), Infiniband, or USB.

What is claimed is:

1. A logic device for peripheral authentication comprising:

a bus interface configured to communicate data with a host device during operation; and an authenticating circuit configured to:

compute a first initialization vector for decrypting encrypted command data from the host device, the encrypted command data comprising ciphertext of a command instruction and a shared subset of a current command tag, the first initialization vector computed based upon a non-shared subset of a prior command tag;

decrypt the encrypted command data using the first initialization vector, thereby obtaining plaintext of the command instruction and a non-shared subset of the current command tag that is not transmitted by the host device;

generate encrypted response data comprising ciphertext of a response instruction and a current response tag; and transmit the encrypted response data to the host device via the bus interface to authenticate the logic device.

2. The logic device of claim 1, wherein plaintext of the response instruction is obtainable to the host device using an initialization vector based upon the non-shared subset of the current command tag.

3. The logic device of claim 1, wherein the response instruction indicates a response code, and wherein the response instruction is constructed based upon the response code.

4. The logic device of claim 1, wherein the authenticating circuit is configured to compute the first initialization vector based upon the non-shared subset of the prior command tag and a pre-configured constant value.

5. The logic device of claim 1, wherein the authenticating circuit is configured to compute the first initialization vector based upon the non-shared subset of the prior command tag and a deterministic value.

6. The logic device of claim 1, wherein when generating the encrypted response data, the authenticating circuit is configured to:

compute a second initialization vector based upon the non-shared subset of the current command tag and a pre-configured constant; and encrypt plaintext of the response instruction using the second initialization vector to generate the ciphertext of the response instruction.

7. The logic device of claim 1 wherein when generating the encrypted response data, the authenticating circuit is configured to:

compute a second initialization vector based upon the non-shared subset of the current command tag and a deterministic value; and encrypt plaintext of the response instruction using the second initialization vector to generate the ciphertext of the response instruction.

8. The logic device of claim 1, wherein the authenticating circuit is further configured to verify the encrypted command data received from the host device based upon comparing the shared subset of the current command tag received from the host device against the current command tag obtained by the authenticating circuit including the non-shared subset of the current command tag computed by the authenticating circuit.

9. The logic device of claim 1, wherein the encrypted command data is encrypted based upon a symmetric encryption algorithm, and wherein the authenticating circuit decrypts the encrypted command data using the symmetric encryption algorithm.

10. The logic device of claim 1, wherein the encrypted command data is encrypted based upon a session key, and wherein the authenticating circuit decrypts the encrypted command data using the session key.

11. The logic device of claim 10, wherein the authenticating circuit is further configured to obtain a plurality of session keys to apply to data of a plurality of communication exchanges with the host device.

12. The logic device of claim 1, further comprising a non-transitory memory configured to store a plurality of command tags, wherein each command tag and each response tag has a preconfigured length defining an amount of bytes.

13. The logic device of claim 1, wherein when generating the encrypted response data, the authenticating circuit is configured to:

compute the current response tag having the shared subset of the current response tag and a discarded subset of the current response tag; and transmit the encrypted response data to the host device, the encrypted response data comprising the ciphertext of the response instruction and the shared subset of the response tag, wherein the authenticating circuit discards the discarded subset of the current response tag.

14. The logic device of claim 1, wherein the bus interface is configured for at least one of Serial Peripheral Interface

38

(SPI), Inter-Integrated Circuit (I2C), Peripheral Component Interconnect (PCI), PCI express (PCIe), Infiniband, or Universal Serial Bus (USB).

15. A print cartridge comprising:
a print material supply chamber;
a bus interface coupled to a host device; and
an authenticating circuit configured to:

compute a first initialization vector for decrypting encrypted command data from the host device, the encrypted command data comprising ciphertext of a command instruction and a shared subset of a current command tag, the first initialization vector computed based upon a non-shared subset of a prior command tag;

decrypt the encrypted command data using the first initialization vector, thereby obtaining plaintext of the command instruction and a non-shared subset of the current command tag that is not transmitted by the host device;

generate encrypted response data comprising ciphertext of a response instruction and a current response tag; and transmit the encrypted response data to the host device via the bus interface to authenticate the print cartridge.

16. The print cartridge of claim 15, wherein plaintext of the response instruction is obtainable to the host device using an initialization vector based upon the non-shared subset of the current command tag.

17. The print cartridge of claim 15, wherein the response instruction indicates a response code, and wherein the response instruction is constructed based upon the response code.

18. The print cartridge of claim 15, wherein the authenticating circuit is configured to compute the first initialization vector based upon the non-shared subset of the prior command tag and a pre-configured constant value.

19. The print cartridge of claim 15, wherein the authenticating circuit is configured to compute the first initialization vector based upon the non-shared subset of the prior command tag and a deterministic value.

20. The print cartridge of claim 15, wherein when generating the encrypted response data, the authenticating circuit is configured to:

compute a second initialization vector based upon the non-shared subset of the current command tag and a pre-configured constant; and encrypt plaintext of the response instruction using the second initialization vector to generate the ciphertext of the response instruction.

* * * * *